(12) United States Patent
Kuwabara et al.

(10) Patent No.: US 11,210,773 B2
(45) Date of Patent: Dec. 28, 2021

(54) INFORMATION PROCESSING APPARATUS, INFORMATION PROCESSING METHOD, AND STORAGE MEDIUM FOR DEFECT INSPECTION AND DETECTION

(71) Applicant: CANON KABUSHIKI KAISHA, Tokyo (JP)

(72) Inventors: Nobuaki Kuwabara, Yokohama (JP); Satoru Mamiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/774,704

(22) Filed: Jan. 28, 2020

(65) Prior Publication Data

US 2020/0250806 A1  Aug. 6, 2020

(30) Foreign Application Priority Data

Feb. 4, 2019  (JP) .............................. JP2019-017910

(51) Int. Cl.
*G06T 7/00* (2017.01)
*G06T 7/70* (2017.01)
(Continued)

(52) U.S. Cl.
CPC .......... *G06T 7/0002* (2013.01); *G06T 3/4038* (2013.01); *G06T 5/50* (2013.01);
(Continued)

(58) Field of Classification Search
CPC ....... G06T 3/4038; G06T 7/0002; G06T 7/33; G06T 7/60; G06T 2200/32;
(Continued)

(56) References Cited

U.S. PATENT DOCUMENTS

2011/0002544 A1\* 1/2011 Oshima ................ G06K 9/6211
382/190
2013/0321463 A1\* 12/2013 Clemo .................. G06T 19/006
345/633
(Continued)

FOREIGN PATENT DOCUMENTS

JP        2018-90981 A      6/2018

OTHER PUBLICATIONS

Bang et al., UAV-based automatic generation of high-resolution panorama at a construction site with a focus on preprocessing for image stitching, Automation in Construction, Aug. 2017, pp. 70-80, vol. 84, Elsevier B.V, Amsterdam, NL.

(Continued)

*Primary Examiner* — Li Liu
(74) *Attorney, Agent, or Firm* — Canon U.S.A., Inc. IP Division

(57) ABSTRACT

The present invention is directed to making it possible to reduce a possibility of image stitching failures. An information processing apparatus includes a feature extraction unit configured to extract feature points from each of a plurality of images of an object to be inspected captured from a plurality of viewpoints, an image quality evaluation unit configured to, for each of the plurality of images, evaluate whether an image quality based on a predetermined index satisfies allowable conditions for inspection works of the object, and an image stitching unit configured to stitch at least a part of the images, among the plurality of images, having the image quality that satisfies the allowable conditions according to a positional relation based on the feature points.

14 Claims, 21 Drawing Sheets

(51) Int. Cl.
*G06T 3/40* (2006.01)
*G06T 5/50* (2006.01)
*G06T 7/60* (2017.01)

(52) U.S. Cl.
CPC ............... *G06T 7/60* (2013.01); *G06T 7/70* (2017.01); *G06T 2207/20221* (2013.01)

(58) Field of Classification Search
CPC ............ G06T 2207/20221; G06T 7/70; G06T 1/0007; G06T 2207/30244; G06K 9/6211; G06K 2009/2045; G06K 9/4671
See application file for complete search history.

(56) References Cited

U.S. PATENT DOCUMENTS

| | | | |
|---|---|---|---|
| 2014/0336928 A1* | 11/2014 | Scott | G01C 21/206 701/468 |
| 2017/0161892 A1 | 6/2017 | Tellatin et al. | |
| 2017/0161927 A1 | 6/2017 | Martin | |
| 2017/0308088 A1* | 10/2017 | Sabe | H04N 5/23238 |
| 2018/0293725 A1* | 10/2018 | Ohshima | G01N 21/88 |
| 2020/0098103 A1* | 3/2020 | Chen | G06T 7/0006 |

OTHER PUBLICATIONS

Ramaswamy et al., Frame Stitching in Indoor Environment Using Drone Captured Images, 2018 25th IEEE International Conference on Image Processing (ICIP), IEEE, Oct. 7, 2018, pp. 91-95.

* cited by examiner

| | CRACK WIDTH ESTIMATION ACCURACY |
|---|---|
| 1502 — 0.5 PIXELS PER mm | ±0.2 mm |
| 1503 — 1 PIXEL PER mm | ±0.1 mm |
| 1504 — 2 PIXELS PER mm | ±0.05 mm |

|  | EVALUATION THRESHOLD VALUE |
|---|---|
| FEATURE POINT | 20 |
| DEFOCUS AMOUNT | 5 |

INFORMATION PROCESSING APPARATUS, INFORMATION PROCESSING METHOD, AND STORAGE MEDIUM FOR DEFECT INSPECTION AND DETECTION

BACKGROUND OF THE INVENTION

Field of the Invention

The present invention relates to a technique for processing a plurality of pieces of image information acquired through image capturing.

Description of the Related Art

Continuous maintenance is essential for infrastructure/structures such as roads, bridges, buildings, towers, walls, dams, tunnels, and so on. In continuous maintenance for infrastructures, it is important to identify, record, and observe cracks and other defective portions.

Examples of inspection methods for infrastructures employed in many cases include a method for capturing images of an infrastructure, identifying cracks and other defects based on the captured images, and evaluating the identified defects. However, if the resolution per unit area on the surface of the infrastructure under inspection is low in the captured image, a difficulty arises in recognizing defects, for example, because of a blurred crack pattern. Therefore, it is demanded that the resolution of a captured image per unit area is equal to or higher than a predetermined value on the surface under inspection. For example, if an infrastructure has a large scale or complicated shape, it is difficult to capture an image of the infrastructure at one time with a predetermined resolution or higher. In such a case, the infrastructure is imaged in split imaging, and defects are identified and evaluated by using the images captured in split imaging.

For example, Japanese Patent Application Laid-Open No. 2018-90981 discusses a technique for estimating the resolutions in the images based on the distance to an object and comparing the average value of the estimated resolutions with a predetermined resolution threshold value to determine whether image acquisition is possible. More specifically, when the average value of the estimated resolutions exceeds the resolution threshold value, the image acquisition is acknowledged and images are stored. On the other hand, when the average value is below the resolution threshold value, the image acquisition is rejected.

The technique discussed in Japanese Patent Application Laid-Open No. 2018-90981 determines whether image acquisition is possible based on the estimated image resolution. However, if whether image acquisition is possible is determined based only on the resolution, the number of images available for the defect evaluation of an object such as an infrastructure may become insufficient, possibly disabling the recognition of defects of the object.

SUMMARY OF THE INVENTION

According to an aspect of the present invention, an information processing apparatus includes a feature extraction unit configured to extract feature points from each of a plurality of images of an object to be inspected captured from a plurality of viewpoints, an image quality evaluation unit configured to, for each of the plurality of images, evaluate whether an image quality based on a predetermined index satisfies allowable conditions for inspection works of the object, and an image stitching unit configured to stitch at least a part of the images, among the plurality of images, having the image quality that satisfies the allowable conditions according to a positional relation based on the feature points extracted by the extraction unit.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 19 illustrates a table held in a threshold value holding unit according to the modification of the first exemplary embodiment.

DESCRIPTION OF THE EMBODIMENTS

The present invention will be described in detail below based on exemplary embodiments with reference to the accompanying drawings. Configurations described in the following exemplary embodiments are to be considered as illustrative, and the present invention is not limited to illustrated configurations.

Figure 1:
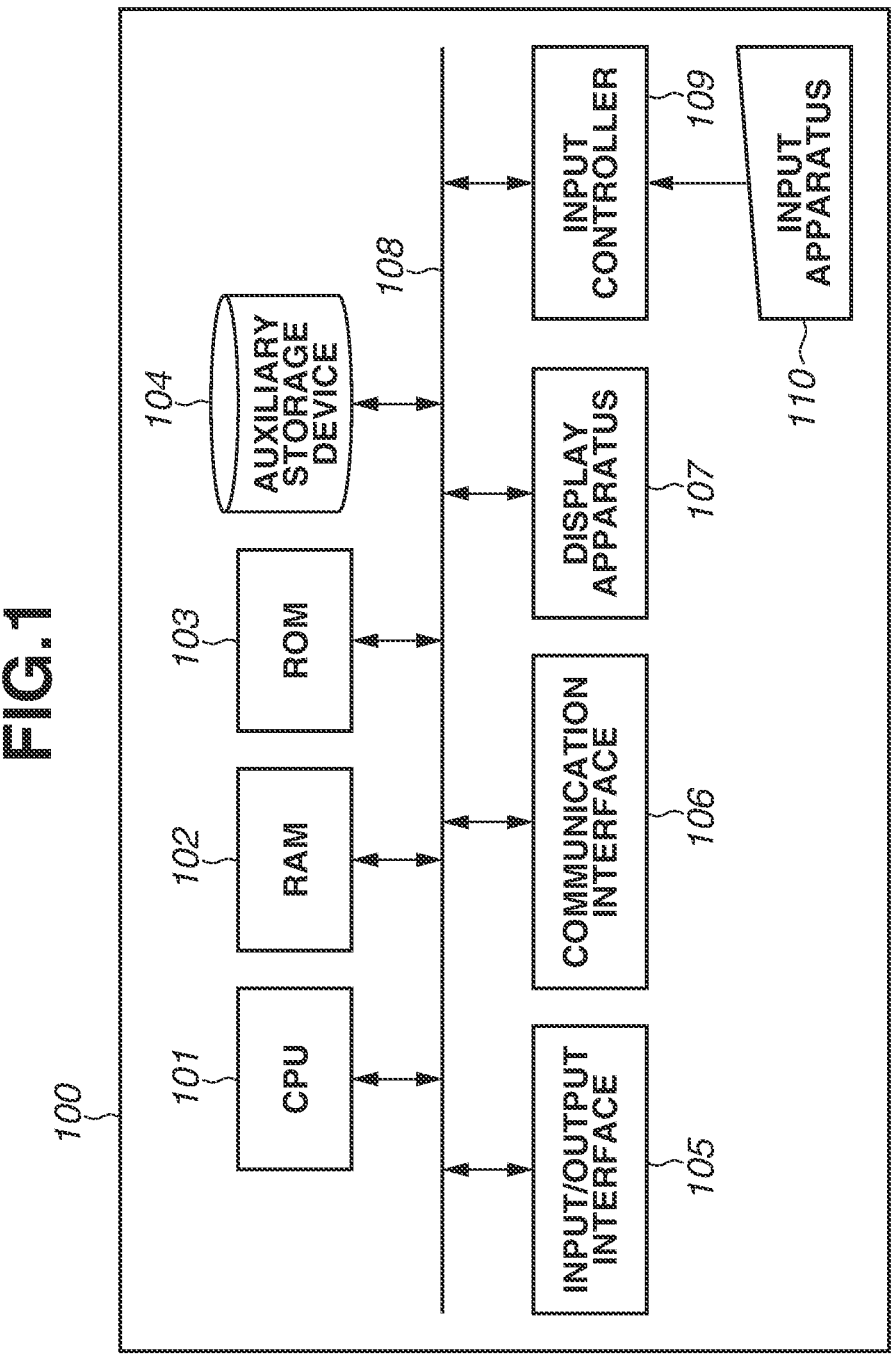
FIG. 1 illustrates an example of an overall configuration of an information processing apparatus according to a first exemplary embodiment.

FIG. 1 is a block diagram illustrating an example of a hardware configuration of an information processing apparatus 100 according to a first exemplary embodiment. The information processing apparatus 100 includes a central processing unit (CPU) 101, a random access memory (RAM) 102, a read only memory (ROM) 103, an auxiliary storage device 104, an input/output interface 105, a communication interface 106, a display apparatus 107, a bus 108, an input controller 109, and an input apparatus 110.

The CPU 101 executes and controls each function of the information processing apparatus 100. The RAM 102 temporarily stores programs and data supplied from an external apparatus. The ROM 103 stores programs and various kinds of parameters without the need of change. The display apparatus 107 displays graphics drawn by the CPU 101. The auxiliary storage device 104 stores various kinds of information. The input/output interface 105 transmits and receives data to/from an external apparatus. The communication interface 106 for connection to a network transmits and receives data to/from an external apparatus via the network. The bus 108 as a system bus connects the CPU 101, the RAM 102, the ROM 103, the auxiliary storage device 104, the input/output interface 105, the communication interface 106, the display apparatus 107, and the input controller 109. The input controller 109 controls input signals from the input apparatus 110 (described below). The input apparatus 110 is an external input apparatus for receiving operation instructions from a user, such as a keyboard and a mouse. Functions and the processing of the information processing apparatus 100 (described below) are implemented when the CPU 101 loads a program stored in the ROM 103 and executes the program.

Exemplary embodiments will be described below centering on a case where images of an infrastructure as an object under inspection are captured, and cracks and other defects are identified and evaluated based on the captured images. According to the present exemplary embodiment, if an infrastructure has a large scale or a complicated shape, defects are identified and evaluated by using an image obtained by stitching images of the infrastructure captured through split imaging. When evaluating defects by using captured images, as described above, it is necessary to acquire images having a resolution per unit area on the surface under inspection equal to or larger than a predetermined value. When stitching images captured through split imaging, the images are mutually positioned based on feature points in the images before image stitching. However, if whether image acquisition is possible is determined by using only the image resolution, like the technique discussed in Japanese Patent Application Laid-Open No. 2018-90981, images may be stored with insufficient feature points. In this case, positioning based on feature points cannot be performed, possibly resulting in image stitching failure.

Therefore, according to the first exemplary embodiment, feature points are extracted from input images captured through split imaging and then evaluated, and the image quality on an object on the input images is evaluated. Then, based on these evaluation results, images available for inspection of the object are evaluated. Then, according to the first exemplary embodiment, a three-dimensional shape of an infrastructure is estimated and, for the estimated three-dimensional shape, input images are mapped (projected) based on the image evaluation results to generate a stitched image.

Figure 2:
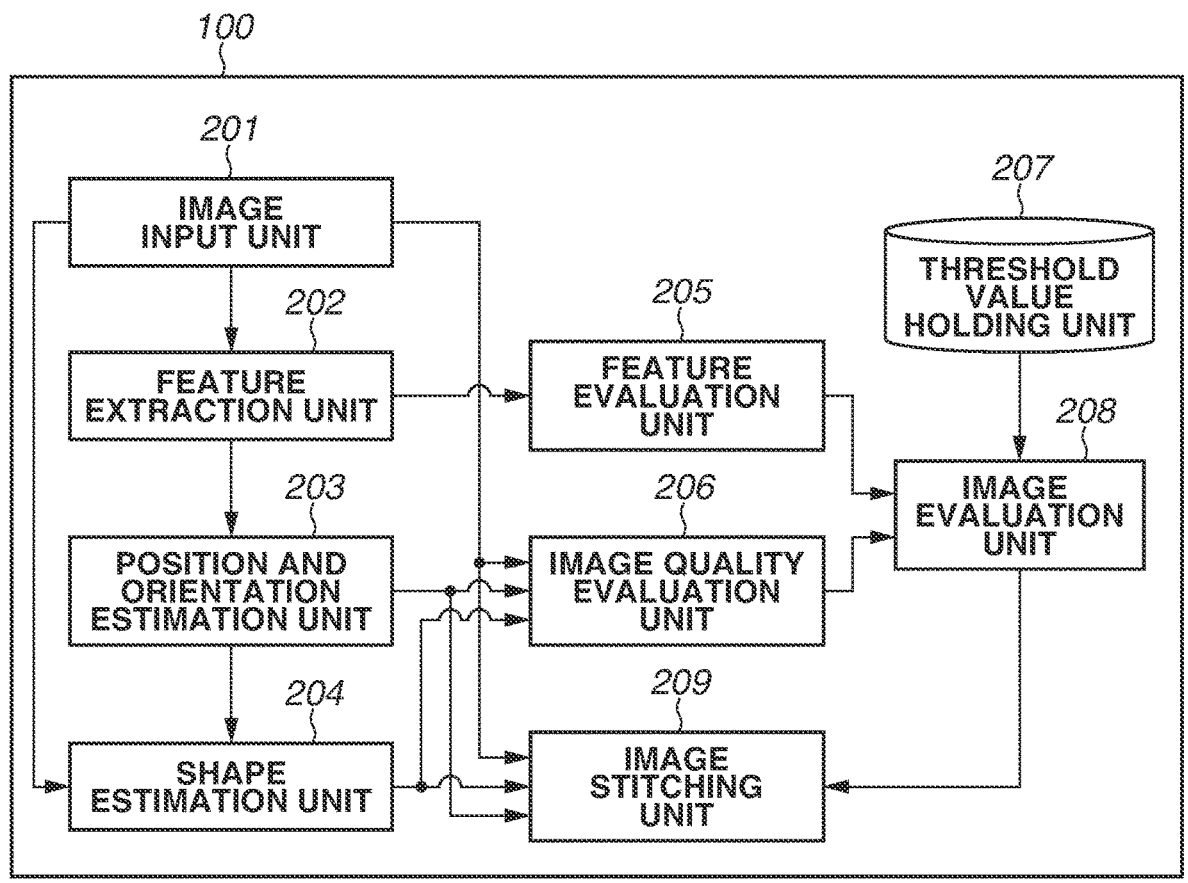
FIG. 2 illustrates a functional configuration of the information processing apparatus according to the first exemplary embodiment.

FIG. 2 is a function block diagram illustrating a functional configuration of the information processing apparatus 100 according to the first exemplary embodiment. The functional configuration of the information processing apparatus 100 according to the first exemplary embodiment will be described below with reference to FIG. 2.

An image input unit 201 acquires images of an object captured by using a camera. An object refers to a target to be inspected by using the captured images. Examples of objects include infrastructure/structures such as concrete surfaces of bridges, dams, and tunnels. However, objects are not limited thereto, and may be concrete, or any other material (e.g. brick), wall surfaces of a variety of structures. Each image acquired by the image input unit 201 includes internal parameters of the camera, i.e., the image resolution, the focal length of the camera, the size of the image sensor, the position of the image center, and information about lens distortion.

A feature extraction unit 202 extracts feature points from input images acquired by the image input unit 201, performs feature point matching between the images, and outputs information about feature points and information about feature point matching to a position and orientation estimation unit 203 and a feature evaluation unit 205. The feature extraction unit 202 will be described in detail below.

The feature evaluation unit 205 evaluates the feature points extracted by the feature extraction unit 202 for each image. The feature evaluation unit 205 will be described in detail below.

The position and orientation estimation unit 203 estimates the position and orientation of the camera which has captured images, based on the information about feature points extracted by the feature extraction unit 202 and the information about feature point matching. Techniques for estimating the camera position and orientation by using image feature points and matching information are generally known, and therefore descriptions thereof will be omitted.

A shape estimation unit 204 estimates the three-dimensional shape of the object under inspection based on the camera position and orientation estimated by the position and orientation estimation unit 203 and the images acquired by the image input unit 201. The shape estimation unit 204 will be described in detail below.

An image quality evaluation unit 206 evaluates the image quality on the object under inspection based the input images acquired by the image input unit 201, the three-dimensional shape of the object calculated by the shape estimation unit 204, and the camera position and orientation estimated by the position and orientation estimation unit 203. The image quality evaluation unit 206 will be described in detail below.

A threshold value holding unit 207 holds threshold values for the result of evaluation by the feature evaluation unit 205 and the result of evaluation by the image quality evaluation unit 206. The threshold values define allowable conditions for determining whether the quality of images is permissible as images to be used for inspection of the infrastructure. According to the first exemplary embodiment, allowable conditions are defined by using the resolution as an index. The threshold value holding unit 207 will be described in detail below.

An image evaluation unit 208 identifies regions available for inspection in the images acquired by the image input unit 201 based on the result of evaluation by the feature evaluation unit 205, the result of evaluation by the image quality evaluation unit 206, and the threshold values held by the threshold value holding unit 207. Then, the image evaluation unit 208 outputs information about the regions available for inspection to an image stitching unit 209. The image evaluation unit 208 will be described in detail below.

The image stitching unit 209 stitches a plurality of images based on the images input from the image input unit 201, the camera position and orientation from the position and orientation estimation unit 203, the three-dimensional shape from the shape estimation unit 204, and the information about the regions available for inspection from the image evaluation unit 208. The image stitching unit 209 will be described in detail below.

The feature extraction unit 202, the shape estimation unit 204, the feature evaluation unit 205, the image quality evaluation unit 206, the threshold value holding unit 207, the image evaluation unit 208, and the image stitching unit 209 will be described in detail below.

The feature extraction unit 202 extracts, for example, Scale-Invariant Feature Transform (SIFT) feature points from the input images acquired by the image input unit 201. SIFT feature points are generally known feature points, and descriptions thereof will be omitted. Feature points used in the present exemplary embodiment are feature points for performing local region matching between object images captured from different image capturing directions and at different image capturing angles. According to the present exemplary embodiment, SIFT feature points are used because of the robustness to the rotation, enlargement, and reduction of an object. According to the present exemplary embodiment, feature points extracted by the feature extraction unit 202 may be feature points other than SIFT feature points as long as local region matching between images can be performed.

Firstly, the shape estimation unit 204 estimates a three-dimensional point group based on the camera position and orientation and the images associated with the camera position and orientation, by using the multi-baseline stereo method. The multi-baseline method performed by the shape estimation unit 204 makes it possible to perform window-based matching centering on image pixels to estimate a three-dimensional point group based on the principle of triangulation.

In this case, Sum of Squared Differences (SSD) in luminance is used as the window-based matching. The shape estimation unit 204 further meshes the three-dimensional point group by using the general Delaunay triangulation. Then, the shape estimation unit 204 outputs the meshed three-dimensional shape to the image quality evaluation unit 206 and the image stitching unit 209.

The feature evaluation unit 205 evaluates the feature points by using the kurtosis of the positions of two-dimensional coordinates of feature points in the images and the number of feature points. More specifically, the feature evaluation unit 205 calculates an evaluation value V for each image by using Equation (1).

$$V = \alpha \cdot \frac{1}{1 + \sum_{j=1}^{2} Ku_j} + \beta \cdot N \qquad \text{Formula (1)}$$

Referring to Equation (1), α and β are arbitrary coefficients indicating the weights of the first and the second terms, respectively. According to the present exemplary embodiment, both α and β are 1. Referring to Equation (1), Ku denotes the kurtosis of the position distribution in two-dimensional coordinates of features points in the images, a coefficient j denotes the dimension of the images, and N denotes the number of feature points. In Equation (1), the evaluation increases with decreasing kurtosis of the distribution (Ku) and increasing number of feature points (N). More specifically, Equation (1) indicates that a higher evaluation value results for images having feature points that are uniformly distributed in the images and having a larger number of feature points. N may be the number of feature points that can be matched with feature points of other images. Likewise, also for feature points to be used for the calculation of the kurtosis of position distribution of two-dimensional coordinates of features points in the images, only feature points that can be matched with feature points of other images may be used for the calculation.

The image quality evaluation unit 206 estimates the resolution of the image capturing target object appearing in the input images acquired by the image input unit 201. According to the present exemplary embodiment, the image quality evaluation unit 206 estimates how many pixels of the image corresponds to a length of 1 mm on the object. For example, when a 3,000 mm by 3,000 mm region on the object is imaged with a camera with 3,000*3,000 pixels, the object is imaged with a resolution of 1 pixel per 1 mm. The number of pixels corresponding to a length of 1 mm on the object can be geometrically calculated based on information about the three-dimensional shape estimated by the shape estimation unit 204, the camera position and orientation estimated by the position and orientation estimation unit 203, and the size and internal camera parameters of the images input to the image input unit 201.

Figure 3:
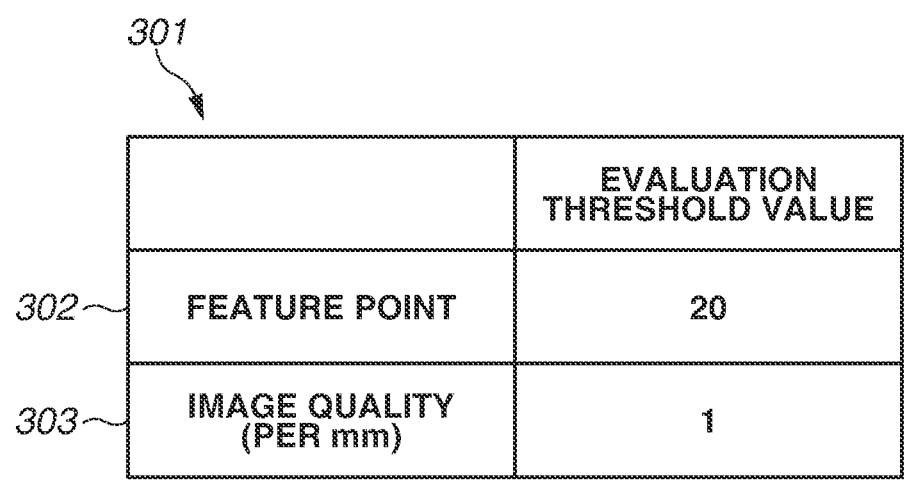
FIG. 3 illustrates a table held in a threshold value holding unit.

The threshold value holding unit 207 holds the threshold values in tabular form. FIG. 3 illustrates an example of a table 301 held by the threshold value holding unit 207. The table 301 holds a threshold value 302 for the feature point evaluation value and a threshold value 303 for the image quality evaluation value. The threshold value 303 for the image quality evaluation value in the table 301 is the resolution on the object, which means, in the example shown in FIG. 3, 1 pixel per 1 mm.

The image evaluation unit 208 compares the evaluation value of the result of evaluation by the feature evaluation unit 205 with the threshold value 302 for the feature point evaluation value held by the threshold value holding unit 207. When the feature point evaluation value is equal to or larger than the threshold value 302, the image evaluation unit 208 further compares the image resolution of each region supplied by the image quality evaluation unit 206 with the threshold value 303 for the image quality evaluation value held by the threshold value holding unit 207 to identify pixels having an image quality evaluation value equal to or larger than the threshold value 303.

According to the present exemplary embodiment, the image resolution for each region is assumed to be the resolution supplied for each pixel in the images. Then, the image evaluation unit 208 outputs position information for pixels identified to have an image quality evaluation value equal to or larger than the threshold value to the image stitching unit 209 as information about the regions available for defect inspection. The information about the regions available for inspection specifically refers to a two-dimensional array including the same number of pixels as the images input to the image input unit 201, where each pixel available for inspection is supplied with "1" and each pixel not available for inspection is supplied with "0".

The image evaluation unit 208 is also able to hold values between 0 to 1 on a multi-value basis, instead of supplying "1" to the regions available for inspection and supplying "0" to the regions not available for inspection in the images. With this method, an image portion where there is no region available for inspection can be compensated with an image portion having a value of the region available for inspection closest to "1" in other images when the image stitching unit 209 performs image stitching.

Figure 4:
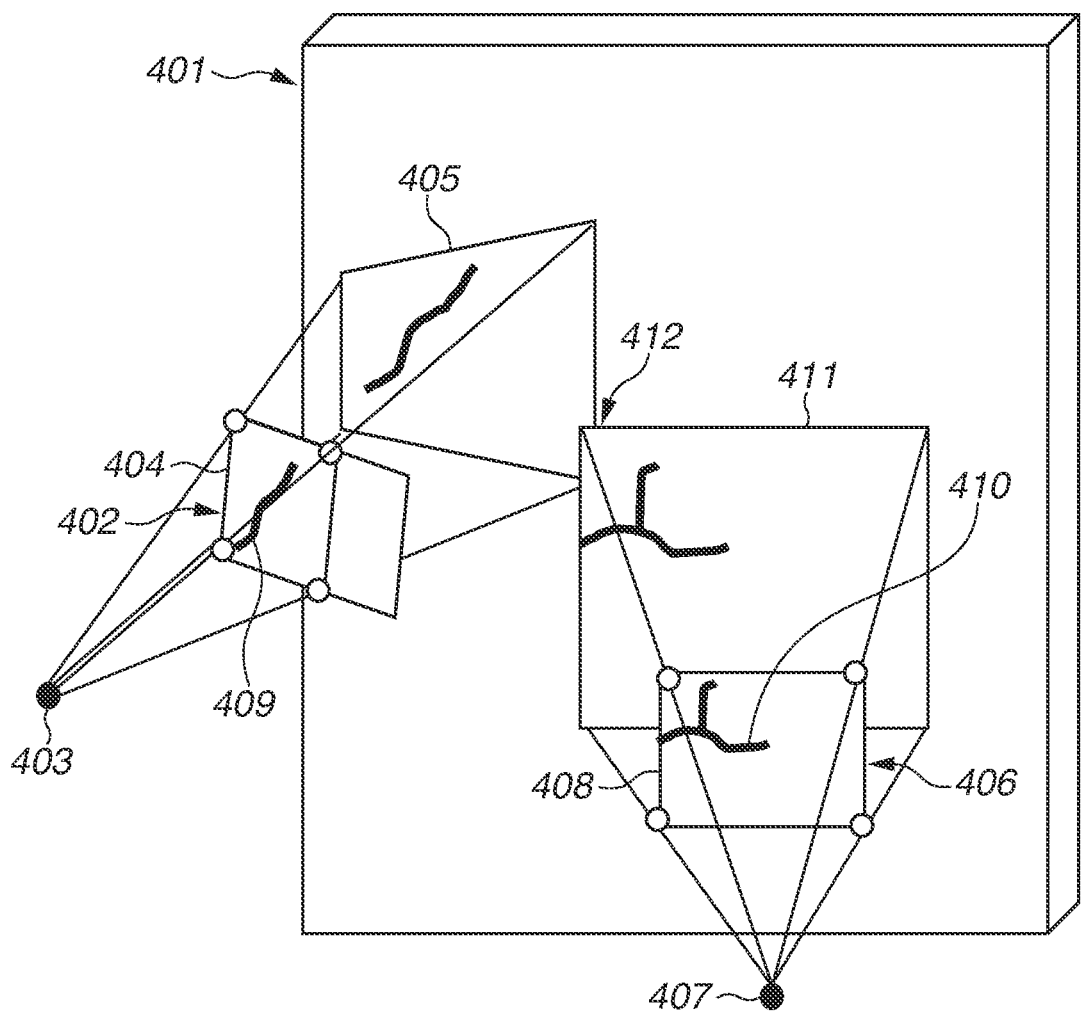
FIG. 4 illustrates a movement result of an image stitching unit.

FIG. 4 illustrates image stitching processing performed by the image stitching unit 209. A three-dimensional shape 401 is the three-dimensional shape estimated by the shape estimation unit 204. Referring to FIG. 4, positions 403 and 407 denote the positions of principal points of the camera(s) at different positions. Imaging planes 402 and 406 represent imaging planes of the camera(s) at these different positions. Although the imaging planes 402 and 406 are originally positioned behind the principal points, the following descriptions will be made on the premise that these imaging planes are disposed in front of the principal points in consideration of the understandability of the drawing. Referring to FIG. 4, the imaging planes 402 and 406 represent crack images 409 and 410, respectively, as defect images formed on respective surfaces. FIG. 4 illustrates that the crack images 409 and 410 are captured and recorded.

Regions 404 and 408 are regions available for inspection in a two-dimensional array input from the image evaluation unit 208. Projection images 405 and 411 represent the projection of the regions 404 and 408 available for inspection onto the three-dimensional shape 401, out of the images on the imaging planes 402 and 406, respectively. A region 412 illustrates a region where the projection images 405 and 411 overlap with each other.

The image stitching unit 209 generates the projection images 405 and 411 of all of the images where the regions available for inspection exist, for the three-dimensional shape 401, and projects these projection images onto the three-dimensional shape 401. The image stitching unit 209 also performs blending processing on a region where images are overlapping, such as the region 412. As the blending processing, for example, multi-band blending processing can be used.

The images of the imaging planes 402 and 406 in the information processing apparatus 100 according to the present exemplary embodiment are subjected to the feature point evaluation by the feature evaluation unit 205. Thus, the projection images 405 and 411 having a small amount of positional deviation in the images can be obtained. By obtaining projection images having a small amount of positional deviation in the images, an effect of preventing degradation of the accuracy in crack evaluation as defect evaluation can be obtained. The reason is as follows. If a position deviation occurs between images in crack inspection, one crack may be broken and accordingly recognized as two different cracks. The present exemplary embodiment makes it possible to reduce the amount of position deviation.

Even when the object is captured from an oblique position such as the position 403 of the principal point of the camera, the information processing apparatus 100 according to the present exemplary embodiment is able to obtain the projection image 405 since the region 404 available for inspection exists. This is effective in a case where the camera is able to image the object only from an oblique position because of the presence of an obstacle or other physical reasons.

The flow of processing performed by the information processing apparatus 100 according to the first exemplary embodiment will be described below with reference to the flowcharts illustrated in FIGS. 5, 6, 7, and 8.

A flow of overall processing of the information processing apparatus 100 will be described below with reference to the flowchart illustrated in FIG. 5.

In step S501, the image input unit 201 acquires images captured by the camera. The image input unit 201 may acquire images from a storage medium storing images captured by a camera, or acquire images captured by a camera via a network. Upon completion of step S501, the processing of the information processing apparatus 100 proceeds to step S502.

In step S502, the feature extraction unit 202 performs processing for extracting feature points on all of the images acquired by the image input unit 201. In step S503, the feature extraction unit 202 performs matching between feature points. The feature extraction unit 202 outputs information about feature points and information about feature point matching to the position and orientation estimation unit 203 and the feature evaluation unit 205. Upon completion of step S502, the processing of the information processing apparatus 100 proceeds to step S504.

In step S504, the position and orientation estimation unit 203 estimates the camera position and orientation based on the information about feature points and the information about feature point matching input from the feature extraction unit 202. The position and orientation estimation unit 203 further outputs the information about the camera position and orientation to the shape estimation unit 204, the image quality evaluation unit 206, and the image stitching unit 209. Upon completion of step S504, the processing of the information processing apparatus 100 proceeds to step S505.

In step S505, the shape estimation unit 204 estimates the three-dimensional shape of the object based on the information about the camera position and orientation input from the position and orientation estimation unit 203 and the images input from the image input unit 201. Upon completion of step S505, the processing of the information processing apparatus 100 proceeds to step S506.

In step S506, the information processing apparatus 100 performs processing for evaluating the images available for inspection. The processing in step S506 will be described in detail below with reference to the flowcharts illustrated in FIGS. 6 and 7. Upon completion of step S506, the processing of the information processing apparatus 100 proceeds to step S507.

In step S507, the information processing apparatus 100 performs image stitching as post-processing. The processing in step S507 will be described in detail below with reference to the flowchart illustrated in FIG. 8. Upon completion of the processing in step S507, the processing of the information processing apparatus 100 ends.

Figure 5:
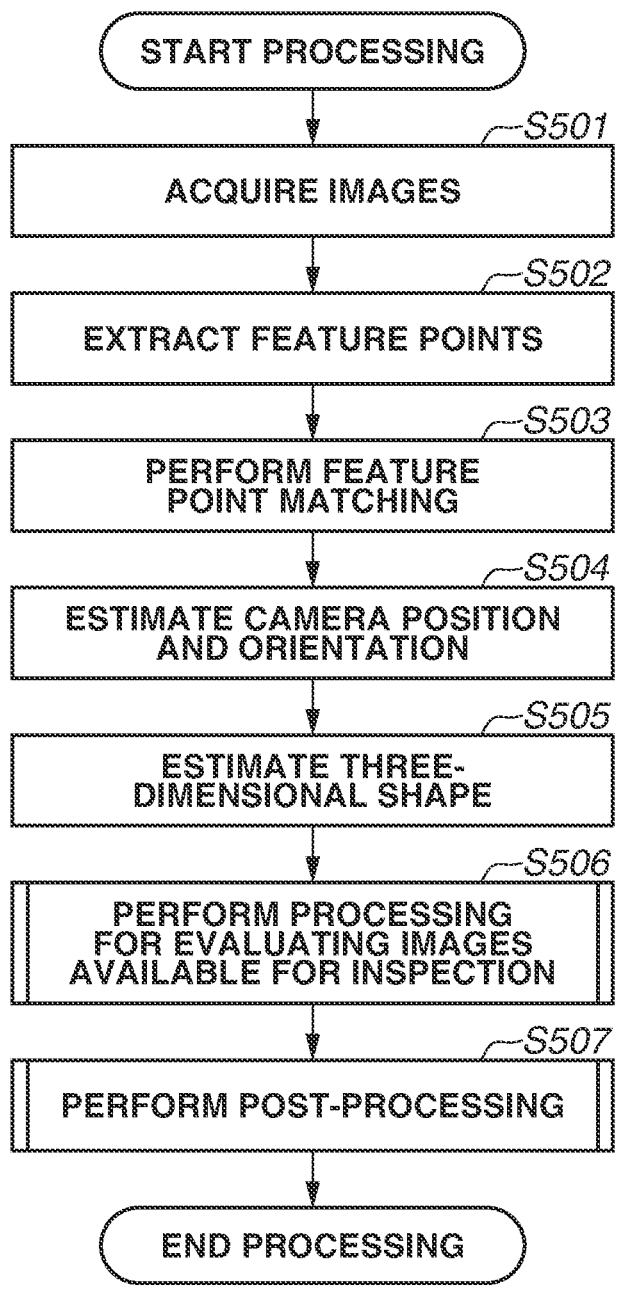
FIG. 5 is a flowchart illustrating processing of the information processing apparatus according to the first exemplary embodiment.
Figure 6:
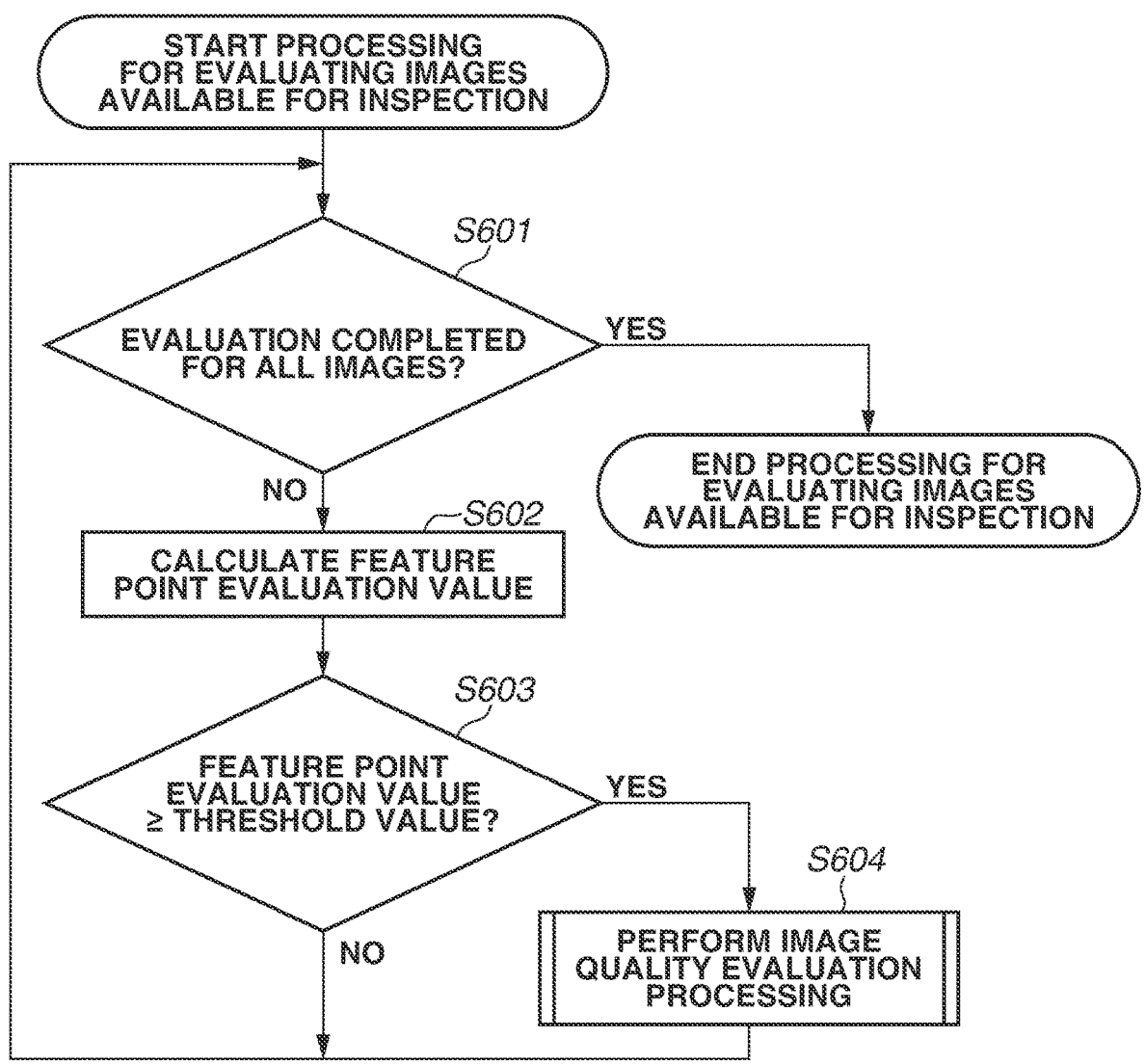
FIG. 6 is a flowchart illustrating processing for evaluating images available for inspection.

FIG. 6 is a detailed flowchart illustrating processing for evaluating the images available for inspection in step S506 illustrated in FIG. 5.

In step S601 illustrated in FIG. 6, the image evaluation unit 208 determines whether the image evaluation is completed for all of the images input from the image input unit 201. When the image evaluation unit 208 determines that the image evaluation is completed for all of the input images (YES in step S601), the image evaluation unit 208 ends the processing for evaluating the images available for inspection. Then, the processing of the information processing apparatus 100 proceeds to step S507. On the other hand, when the image evaluation unit 208 determines that the image evaluation is not completed for all of the input images (NO in step S601), the processing of the information processing apparatus 100 proceeds to step S602.

In step S602, the feature evaluation unit 205 acquires the information about feature points from the feature extraction unit 202 and calculates the evaluation value of the feature points. An evaluation Equation denoted by Equation (1) is used to calculate the evaluation value of feature points. Upon completion of step S602, the processing of the information processing apparatus 100 proceeds to step S603.

In step S603, the image evaluation unit 208 compares the feature point evaluation value calculated by the feature evaluation unit 205 with the threshold value 302 for the feature point evaluation value held by the threshold value holding unit 207 to determine whether the feature point evaluation value is equal to or larger than the threshold value. When the image evaluation unit 208 determines that the feature point evaluation value is equal to or larger than the threshold value (YES in step S603), the processing of the information processing apparatus 100 proceeds to step S604. On the other hand, when the image evaluation unit 208 determines that the feature point evaluation value is smaller than the threshold value (NO in step S603), the processing of the information processing apparatus 100 returns to step S601.

In step S604, the information processing apparatus 100 performs the image quality evaluation processing. Then, the processing of the information processing apparatus 100 returns to step S601.

Figure 7:
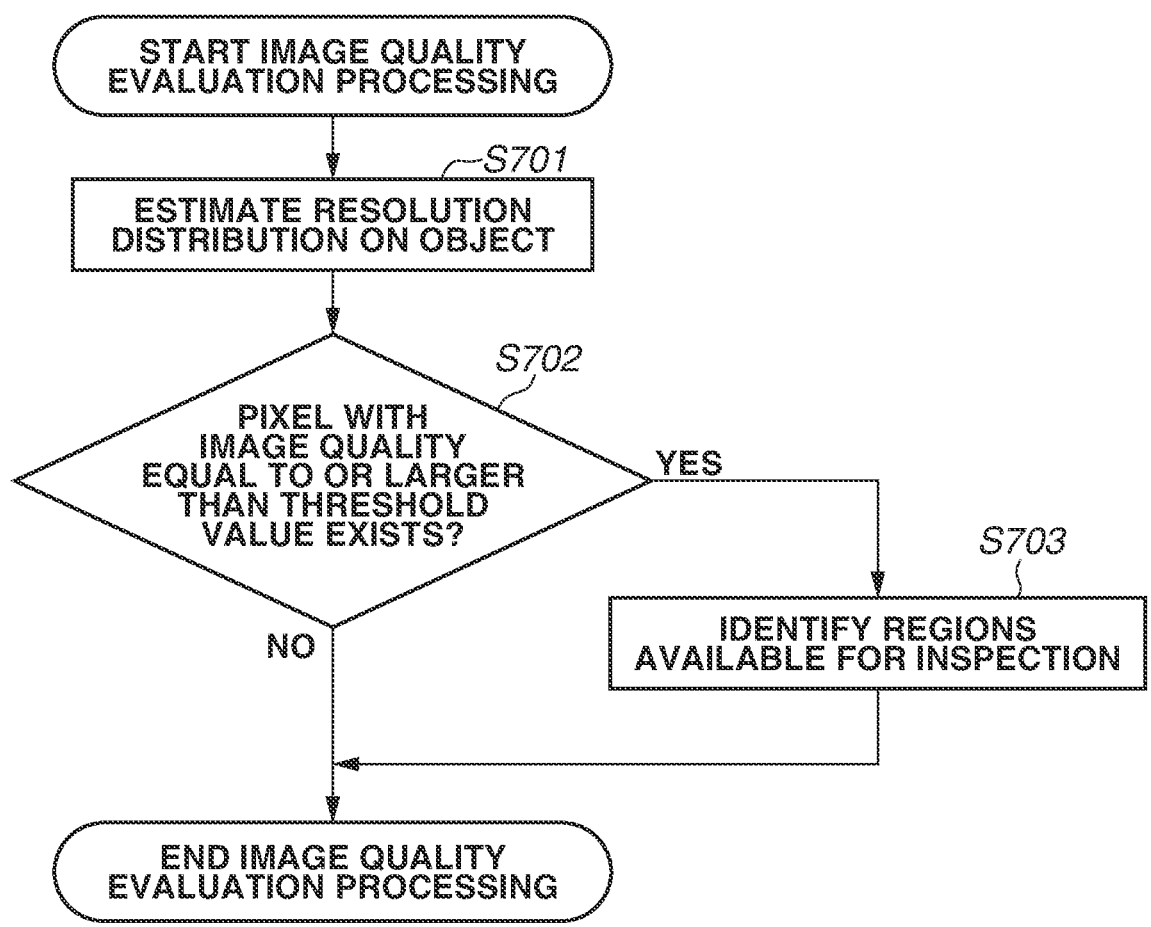
FIG. 7 is a flowchart illustrating image quality evaluation processing according to the first exemplary embodiment.

FIG. 7 is a detailed flowchart illustrating the image quality evaluation processing in step S604 illustrated in FIG. 6.

In step S701, the image quality evaluation unit 206 estimates the resolution distribution on the object based on the images input from the image input unit 201. Upon completion of step S701, the processing of the information processing apparatus 100 proceeds to step S702.

In step S702, the image evaluation unit 208 compares the resolution for each pixel in the images supplied by the image quality evaluation unit 206 with the threshold value 303 for the image quality evaluation value held by the threshold value holding unit 207 to determine whether there exists a pixel having a value equal to or larger than the threshold value. When the image evaluation unit 208 determines that there exists a pixel having a value equal to or larger than the threshold value (YES in step S702), the processing of the information processing apparatus 100 proceeds to step S703. On the other hand, when the image evaluation unit 208 determines that there exists no pixel having a value equal to or larger than the threshold value (NO in step S702), the information processing apparatus 100 ends the image quality evaluation processing.

In step S703, the image evaluation unit 208 outputs position information for a pixel identified to have a value equal to or larger than the threshold value in S702 to the image stitching unit 209 as information about the region available for inspection. Then, the information processing apparatus 100 ends the image quality evaluation processing.

Figure 8:
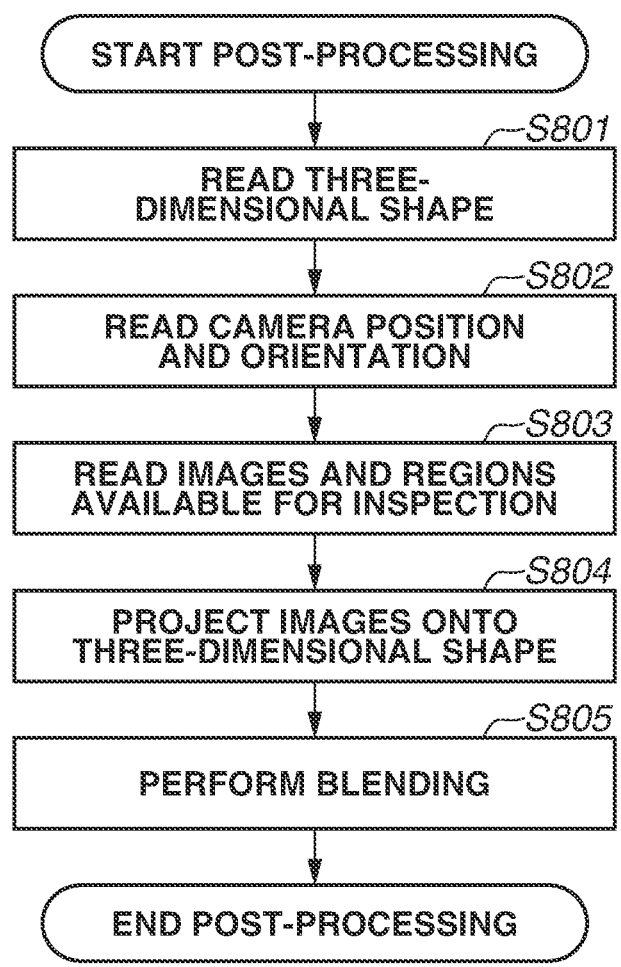
FIG. 8 is a flowchart illustrating post-processing according to the first exemplary embodiment.

FIG. 8 is a detailed flowchart illustrating the post-processing in step S507 illustrated in FIG. 5.

In step S801, the image stitching unit 209 reads the three-dimensional shape from the shape estimation unit 204. Then, the processing proceeds to step S802.

In step S802, the image stitching unit 209 reads the camera position and orientation estimated by the position and orientation estimation unit 203. Then, the processing proceeds to step S803.

In step S803, the image stitching unit 209 acquires the images input from the image input unit 201. The image stitching unit 209 also acquires the information about the regions available for inspection corresponding to the images input from the image input unit 201, from the image evaluation unit 208. Then, the processing proceeds to step S804.

In step S804, the image stitching unit 209 projects the images of the regions available for inspection corresponding to the images input from the image input unit 201 onto the three-dimensional shape input from the shape estimation unit 204, based on the camera position and orientation. Then, the processing proceeds to step S805.

In step S805, the image stitching unit 209 performs the blending processing on the overlapping portion of the images projected onto the three-dimensional shape input from the shape estimation unit 204. Then, the processing of the information processing apparatus 100 ends.

As described above, the information processing apparatus 100 according to the first exemplary embodiment evaluates the feature points of the images and the image resolution, and projects the images having preferable evaluation results to a three-dimensional shape. More specifically, the present exemplary embodiment makes it possible to reduce image stitching failure through the stitching processing using the feature points available for accurate positioning and to stitch images having a resolution available for defect inspection. Thus, the present exemplary embodiment makes it possible to acquire images available for defect evaluation of an object such as an infrastructure, and therefore to recognize defects of the object.

As a first modification of the first exemplary embodiment, an example where the index of the image quality to be evaluated by the image quality evaluation unit 206 is the defocus amount, i.e., an example where the degree of focusing on the object is evaluated by the image quality evaluation unit 206 is described. The defocus amount refers to a numerical representation of the amount of anteroposterior deviation in focusing on the object at pixel positions in the images. At the time of image capturing, the defocus amount can be acquired as defocus amount information at pixel positions by using an imaging plane phase difference image sensor. As a method for acquiring the defocus amount information, a known technique can be used. For example, an automatic focus technique using the amount of anteroposterior deviation in focusing detected by the imaging plane phase difference image sensor has already been widely used.

Figure 18:
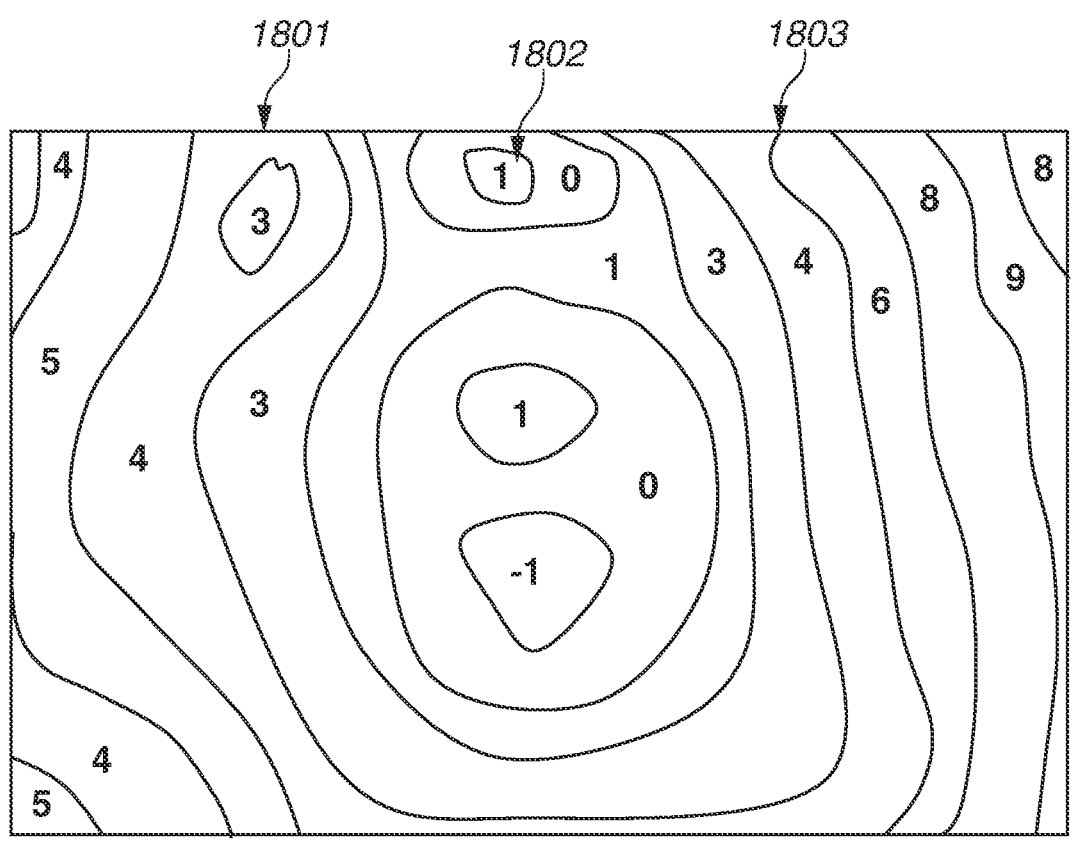
FIG. 18 illustrates a defocus amount according to a modification of the first exemplary embodiment.

FIG. 18 illustrates an example of a defocus map for visualizing the defocus amount information for the images input from the image input unit 201. According to the first modification, the defocus amount information is detected based on the size of a permissible circle-of-confusion focused on the pixels of the image sensor. The defocus amount information accompanies the images input from the image input unit 201. An outer frame 1801 is a frame corresponding to the image size (image boundary) of the input images. A numerical value 1802 indicates information about the defocus amount in each region. A line 1803 indicates a boundary line between regions having different defocus amounts.

In the defocus map, a region to which "0" is assigned indicates an error-free region in the focusing unit of an imaging apparatus, a region to which "−1" is assigned indicates a region of the front focus in one focusing unit of the imaging apparatus, and a region to which "1" is assigned indicates a region of the rear focus in one focusing unit of the imaging apparatus. The focusing unit may be any level-based unit that enables the determination of the focusing state (degree). For example, the width of the defocus amount, such as 5 mm or 8 mm in the depth direction, can be defined as one unit. There is a value determined by the ratio of the size of the image sensor of the imaging apparatus to the size of the permissible circle-of-confusion of an optical lens system including a diaphragm.

In the following descriptions, configurations which have already been described above in the first exemplary embodiment are assigned the same reference numerals, and redundant descriptions thereof will be omitted. The following descriptions will be made centering on differences from the first exemplary embodiment. The functional configuration of the information processing apparatus 100 according to the first modification is similar to that according to the first exemplary embodiment illustrated in FIG. 2. However, the modification differs from the first exemplary embodiment in the operations of the image quality evaluation unit 206 and in the threshold values held by the threshold information holding unit 207. The image quality evaluation unit 206 according to the first modification acquires the defocus amount information accompanying input images acquired by the image input unit 201. According to the first modification, the defocus amount information is information accompanying images. When images are RAW data holding information about an imaging plane phase difference image sensor, the defocus amount information is calculated based on phase difference information.

The threshold information holding unit 207 holds threshold values in tabular form. FIG. 19 illustrates an example of a table 1901 held by the threshold value holding unit 207 according to the first modification. The table 1901 holds a threshold value 1902 for the feature point evaluation value and a threshold value 1903 for the image quality evaluation value. The threshold value 1903 for the image quality evaluation value in the table 1901 refers to a threshold value for the value of the defocus amount corresponding to the image. According to the first modification, regions where the value of the defocus amount is 5 or less are regions available for inspection. More specifically, referring to the defocus map illustrated in FIG. 18, for example, image regions other than some regions on the right-hand side, where the value of the defocus amount is 6 or larger, are regions available for inspection.

Figure 20:
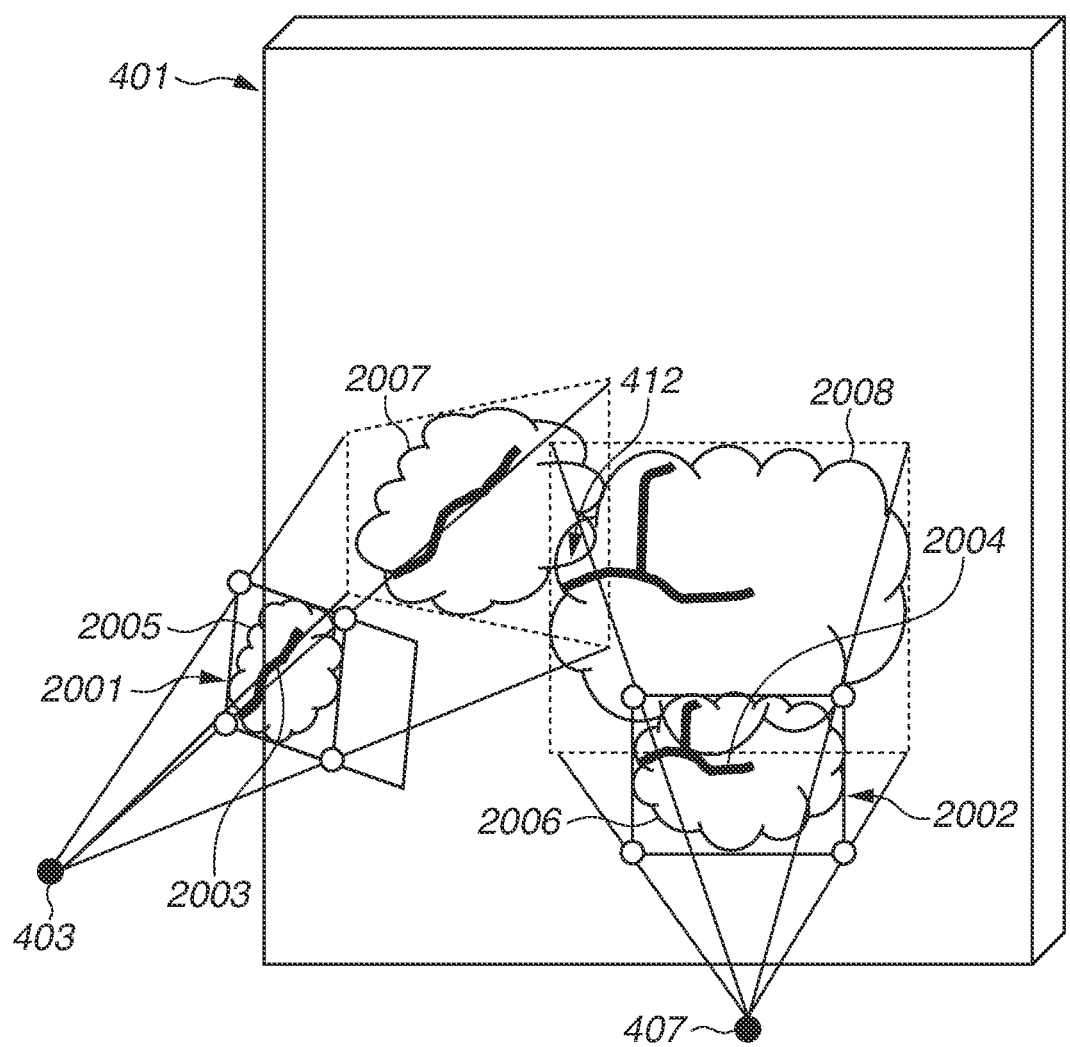
FIG. 20 illustrates a movement result of an image stitching unit according to the modification of the first exemplary embodiment.

FIG. 20 illustrates the image stitching processing performed by the image stitching unit 209 and corresponds to FIG. 4 according to the first exemplary embodiment. A three-dimensional shape 401 is the three-dimensional shape estimated by the shape estimation unit 204. Referring to FIG. 20, positions 403 and 407 indicate the positions of the principal points of the camera(s) at different positions. Imaging planes 2001 and 2002 represent imaging planes of the camera(s) at these different positions. Referring to FIG. 20, like FIG. 4, the imaging planes are disposed in front of the principal points in consideration of the understandability of the drawing. In addition, the imaging planes 2001 and 2002 represent crack images 2003 and 2004, respectively, as defect images focused on respective planes, and the crack images 2003 and 2004 are captured and recorded.

Regions 2005 and 2006 are regions available for inspection in a two-dimensional array input from the image evaluation unit 208. Projection images 2007 and 2008 represent the projection of the regions 2005 and 2006 available for inspection, out of the images on the imaging planes 2001 and 2002, respectively, onto the three-dimensional shape 401.

The image stitching unit 209 generates the projection images 2007 and 2008 in all of the images where the regions available for inspection exist for the three-dimensional shape 401, and projects these projection images onto the three-dimensional shape 401. Like the first exemplary embodiment, the image stitching unit 209 also performs blending processing on a region where images are overlapping, such as the region 412. Also, in the first modification, the images on the imaging planes 2001 and 2002 in the information processing apparatus 100 are subjected to the feature point evaluation by the feature evaluation unit 205. Thus, the projection images 2007 and 2008 having a small amount of positional deviation in the images can be obtained. Even when the object is captured from an oblique position such as the position 403 of the principal point of the camera, the information processing apparatus 100 according to the first modification makes it possible to obtain the projection image 2007 since the region 2005 available for inspection exists.

Figure 21:
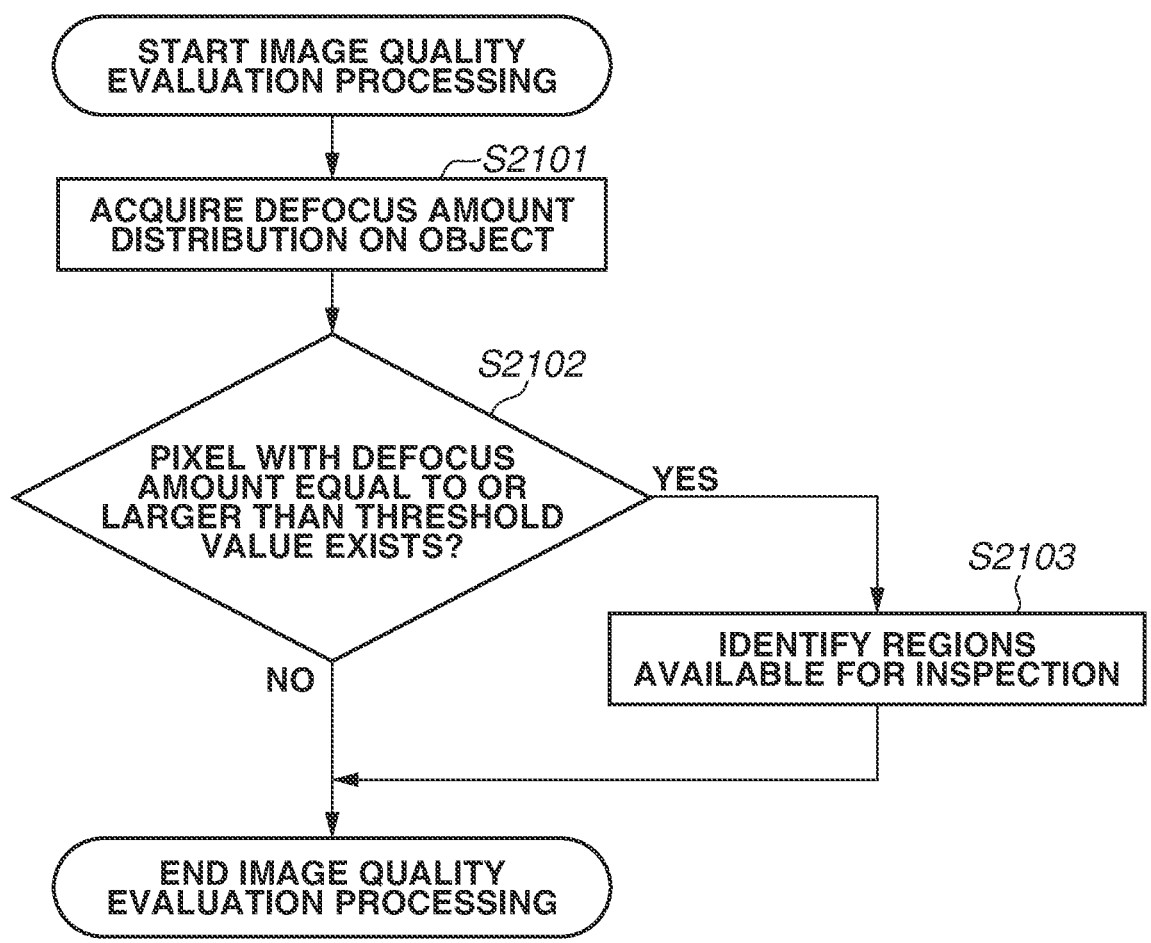
FIG. 21 is a flowchart illustrating image quality evaluation processing according to the modification of the first exemplary embodiment.

The processing of the information processing apparatus 100 according to a modification of the first exemplary embodiment is performed according to the flowcharts illustrated in FIGS. 5, 6, 8, and 21. The flowcharts illustrated in FIGS. 5 and 8 are similar to those according to the first exemplary embodiment, and redundant descriptions thereof will be omitted. In the image quality evaluation processing illustrated in FIG. 6, the processing of the flowchart illustrated in FIG. 21 is performed instead of the flowchart illustrated in FIG. 7.

The image quality evaluation processing in step S604 illustrated in FIG. 6 according to the modification will be described in detail below with reference to the flowchart illustrated in FIG. 21. In step S2101, the image quality evaluation unit 206 acquires defocus amount distribution information for the images input from the image input unit 201. In step S2102, the image evaluation unit 208 compares information for the defocus amount for each pixel in the images supplied by the image quality evaluation unit 206 with the threshold value 1903 for the image quality evaluation value held by the threshold value holding unit 207 to determine whether there exists a pixel having a defocus amount larger than the threshold value. When the image evaluation unit 208 determines that there exists a pixel having a defocus amount larger than the threshold value (YES in step S2102), the processing of the information processing apparatus 100 proceeds to step S2103. On the other hand, when the image evaluation unit 208 determines that there exists no pixel having a defocus amount larger than the threshold value (NO in step S2102), the information processing apparatus 100 ends the image quality evaluation processing.

In step S2103, the image evaluation unit 208 outputs position information for a pixel identified to have a defocus amount larger than the threshold value in S2102 to the image stitching unit 209, as information about the region available for inspection. Then, the information processing apparatus 100 ends the image quality evaluation processing.

As discussed above, the information processing apparatus 100 according to the first modification of the first exemplary embodiment evaluates the feature points and the defocus amount of images, and projects images with the preferable evaluation results to a three-dimensional shape. More specifically, the first modification makes it possible to reduce image stitching failure through the stitching processing using the feature points available for accurate positioning and to stitch images having a defocus amount available for defect inspection.

The use of the defocus amount for the evaluation in image stitching makes it possible to use only the regions where the focus is within a threshold value, thus eliminating image failure caused due to a physical error factor that had been unavoidable in the geometric resolution estimation according to the first exemplary embodiment. If a stitched image becomes an in-focus unclear image, this problem can be handled as a report item when performing image capturing again as a problem of image shake in image capturing. Alternatively, if the amount of image shake width can be confirmed in the unclear image, it is possible to perform defect inspection in consideration of image shake instead of performing image capturing again. Thus, the first modification makes it possible to acquire defocus-amount-based available images for the defect evaluation on an object such as an infrastructure and therefore to recognize defects of the object.

According to the first exemplary embodiment and the first modification, the processing of the information processing apparatus 100 ends when the image stitching unit 209 projects input image regions where the image quality satisfies the allowable conditions, onto the three-dimensional shape estimated based on the feature amount of the input images. A second modification of the first exemplary embodiment will be described below centering on a case where processing for generating inspection images to be used for object inspection works is added.

Inspection of an object specifically refers to identifying and evaluating cracks and other defects based on captured images of a structure (infrastructure) as an object under inspection. Defect identification works are manually performed. Alternatively, defect identification works are performed by detecting defects in the images by using a learnt model that have learned. In either case, it is preferable to use images viewed from a viewpoint facing the surface under inspection of the structure. For example, when defects are cracks, a crack width is viewed in different ways between a case where the structure is viewed from a viewpoint facing the structure and a case where the structure is viewed from a viewpoint tilted by a tilt angle. More specifically, in an image captured in tilt image capturing, cracks having the same width existing on the near and far sides in the image are viewed in different ways. Therefore, it is necessary to determine the crack width based on different criteria. When performing defect identification works within a wide range of a large structure, it is troublesome to minutely change the determination criterion in consideration of the tilt angle for each region. To identify defects based on determination criterion unified as much as possible on the entire portion of a large structure in this way, it is preferable to use inspection images equivalent to images of the structure captured from a position facing each region of the structure.

According to the first exemplary embodiment and the first modification, the image stitching unit 209 can generate a three-dimensional model in which input image regions where the image quality satisfies the allowable conditions are projected onto the three-dimensional shape estimated based on the feature amounts of the input images. Therefore, inspection images for the structure can be generated by a generation unit as a function of the CPU 101. More specifically, with the position of a virtual camera arbitrarily set, the generation unit clips partial images viewed from a position facing the structure to a size suitable for processing in the subsequent stage to generate inspection images. The information processing apparatus 100 displays the generated inspection images on the display apparatus 107. When manually performing inspection, an inspector identifies crack portions based on the displayed inspection images and inputs crack information by using the input apparatus 110. For example, cracks of the inspection images are traced by using a pointing device.

A second exemplary embodiment will be described below.

According to the second exemplary embodiment, unlike the first exemplary embodiment, the image quality evaluation unit 206 also evaluates not only the resolution on the object but also the angle between light incident to the camera and a surface of an object. In the following descriptions, configurations which have already been described above in the first exemplary embodiment are assigned the same reference numerals, and redundant descriptions thereof will be omitted. The image quality evaluation unit 206 different from that according to the first exemplary embodiment will be described in detail below.

For each pixel in the images input from the image input unit 201, the image quality evaluation unit 206 estimates the angle between light incident to the camera and the object surface based on the three-dimensional shape estimated by the shape estimation unit 204 and the camera position and orientation estimated by the position and orientation estimation unit 203.

The angle between light incident to the camera and the object surface will be described below with reference to FIG. 9.

Figure 9:
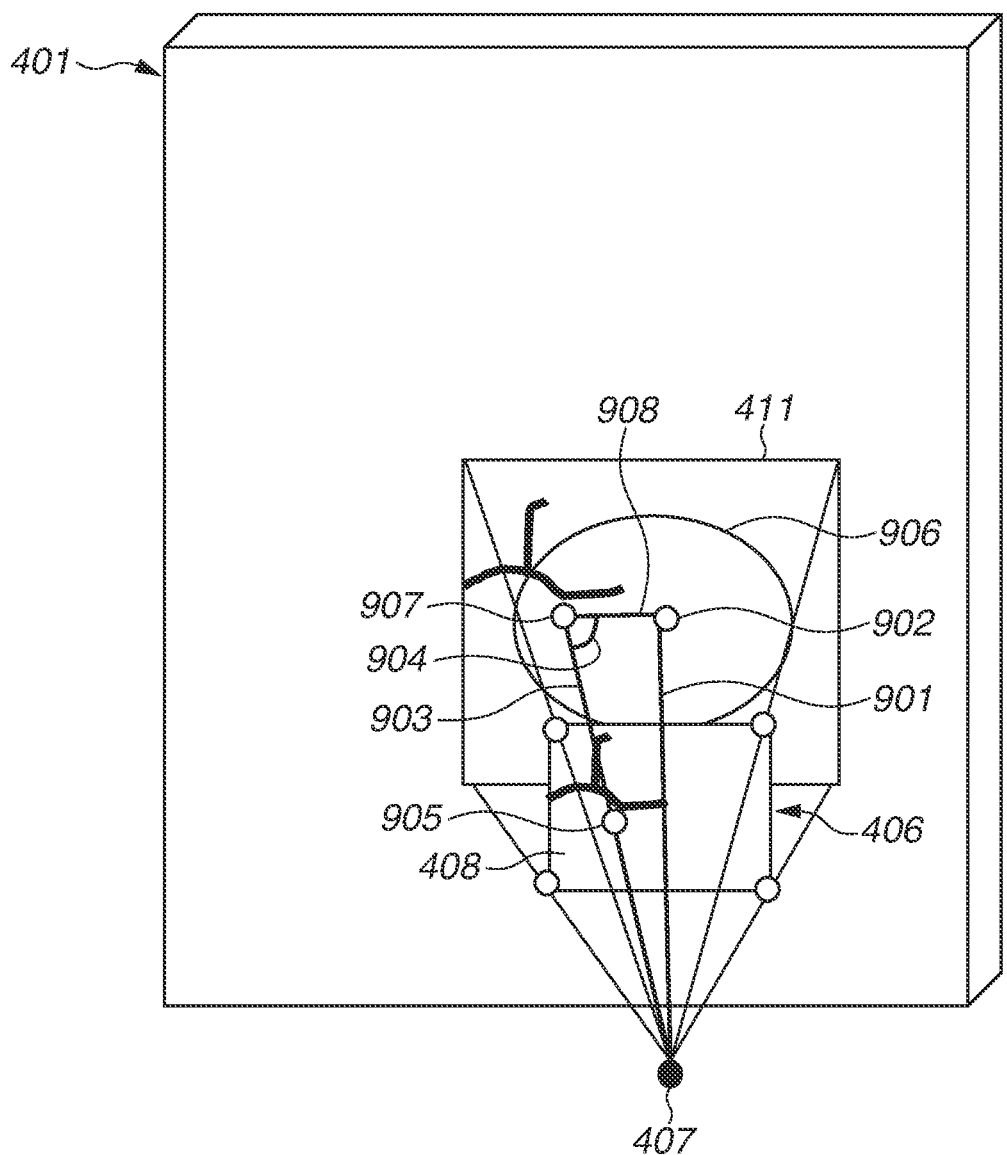
FIG. 9 illustrates an angle between a surface of an object and light incident to a camera.

The angle between light incident to the camera and the object surface refers to an angle 904 illustrated in FIG. 9. The angle 904 is an angle corresponding to a position 905 in the image on the imaging plane 406. The angle 904 is an angle made by lines 903 and 908. The line 903 is a line starting from the principal point 407 of the camera and passing through the position 905 in the image. The line 908 is a line connecting intersections 902 and 907. The intersection 907 is an intersection between the line 903 and the three-dimensional shape 401 of the object surface. The intersection 902 is an intersection between a line 901 and the three-dimensional shape 401 of the object surface. The line 901 is a line starting from the principal point 407 of the camera and passing through the image center.

When the angle 904 decreases, cracks appearing on the imaging plane 406 appears thin in the image. Therefore, when actually performing inspection by using the stitched image generated by the information processing apparatus 100, the crack width may be incorrectly recognized thinner than it actually is.

Therefore, the present exemplary embodiment is intended to reduce the possibility that the crack width is incorrectly recognized thinner than it actually is by setting a predetermined value or larger to the angle between light incident to the camera and the object surface. According to the present exemplary embodiment, the predetermined value is, for example, 60 degrees or more.

The information processing apparatus 100 according to the present exemplary embodiment holds the threshold value for the angle between light incident to the camera and the object surface in tabular form in the threshold value holding unit 207, and adds the threshold value, for example, to the line below the threshold value 303 for the image quality evaluation value illustrated in FIG. 3.

Then, for each pixel in the images input from the image input unit 201, the image quality evaluation unit 206 evaluates whether the angle between light incident to the camera and the object surface is equal to or larger than a threshold value, in addition to the resolution on the object. In the case of the example illustrated in FIG. 9, the region where an angle of light incident to the camera with respect to the object surface is equal to or larger than the threshold value is inside a region 906.

Figure 10:
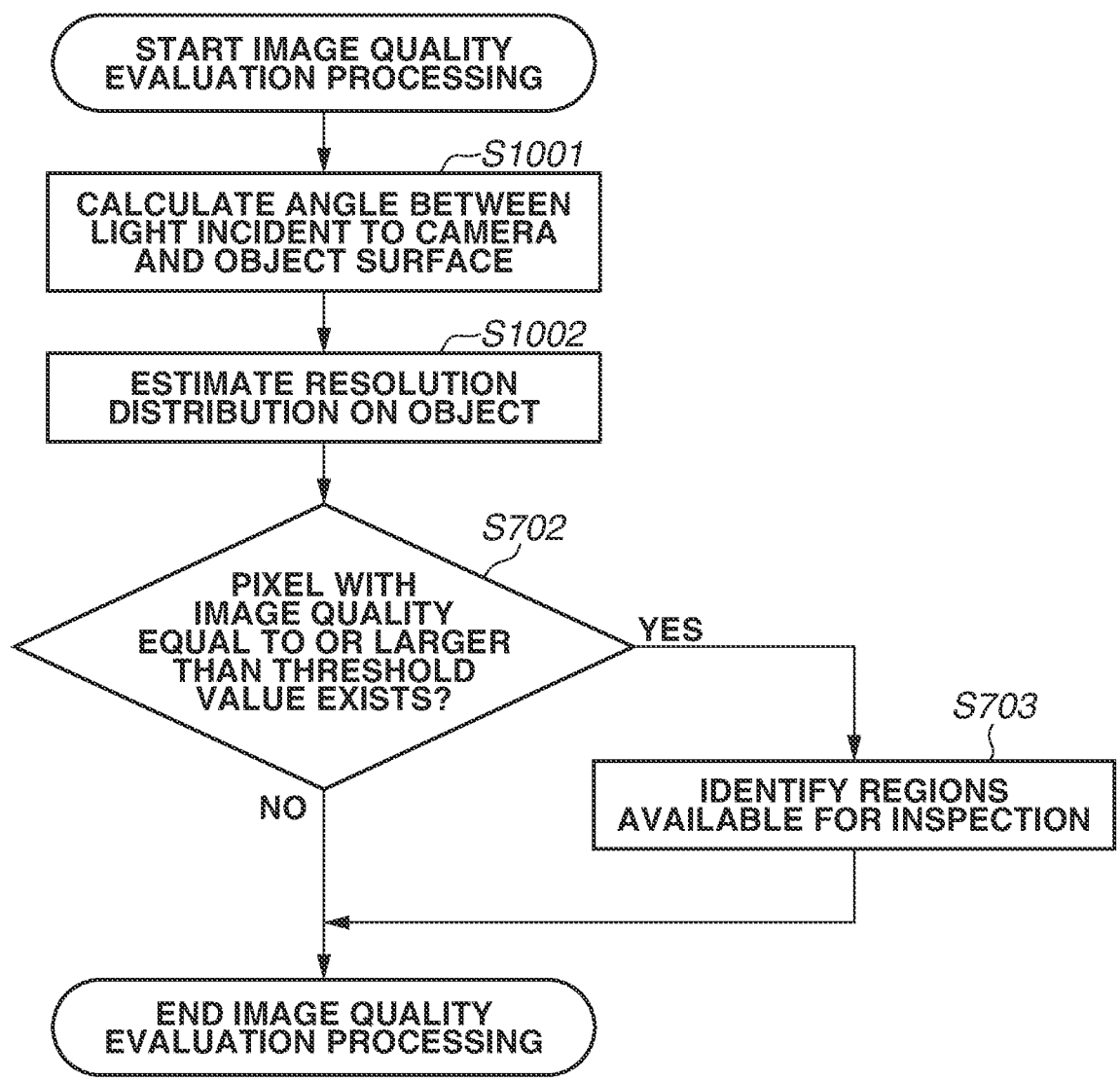
FIG. 10 is a flowchart illustrating image quality evaluation processing according to a second exemplary embodiment.

FIG. 10 is a flowchart illustrating the flow of the image quality evaluation processing of the information processing apparatus 100 according to the second exemplary embodiment. The processing in steps S702 and S703 of the flowchart illustrated in FIG. 10 is similar to the processing in steps S702 and S703 of the flowchart illustrated in FIG. 7, respectively, and redundant descriptions thereof will be omitted. According to the second exemplary embodiment, processing other than the image quality evaluation processing in step S604 according to the first exemplary embodiment is similar to the processing flow according to the first exemplary embodiment.

The image quality evaluation processing in step S604 according to the second exemplary embodiment will be described below with reference to the flowchart illustrated in FIG. 10.

In step S1001 with respect to the images input from the image input unit 201, the image quality evaluation unit 206 calculates the angle between light incident to the camera and the object surface for each pixel. Then, the processing of the image quality evaluation unit 206 proceeds to step S1002.

In step S1002, the image quality evaluation unit 206 reads the threshold value for the angle between light incident to the camera and the object surface, from the threshold value holding unit 207. Then, the image quality evaluation unit 206 identifies regions where the angle between light incident to the camera and the object surface is equal to or larger than the threshold value. The image quality evaluation unit 206 further estimates the resolution distribution on the object for pixels belonging to the regions where the angle between light incident to the camera and the object surface is equal to or larger than the threshold value. Then, the processing of the information processing apparatus 100 proceeds to step S702. The processing in steps S702 and S703 is similar to the processing in the flowchart according to the first exemplary embodiment illustrated in FIG. 7, and redundant descriptions thereof will be omitted.

As described above, the information processing apparatus 100 according to the second exemplary embodiment makes it possible to reduce the possibility that the crack width is incorrectly recognized thinner than it actually is by evaluating the angle between light incident to the camera and the object surface.

A third exemplary embodiment will be described below. In the following descriptions, configurations which have already been described above in the first exemplary embodiment are assigned the same reference numerals, and redundant descriptions thereof will be omitted.

Figure 11:
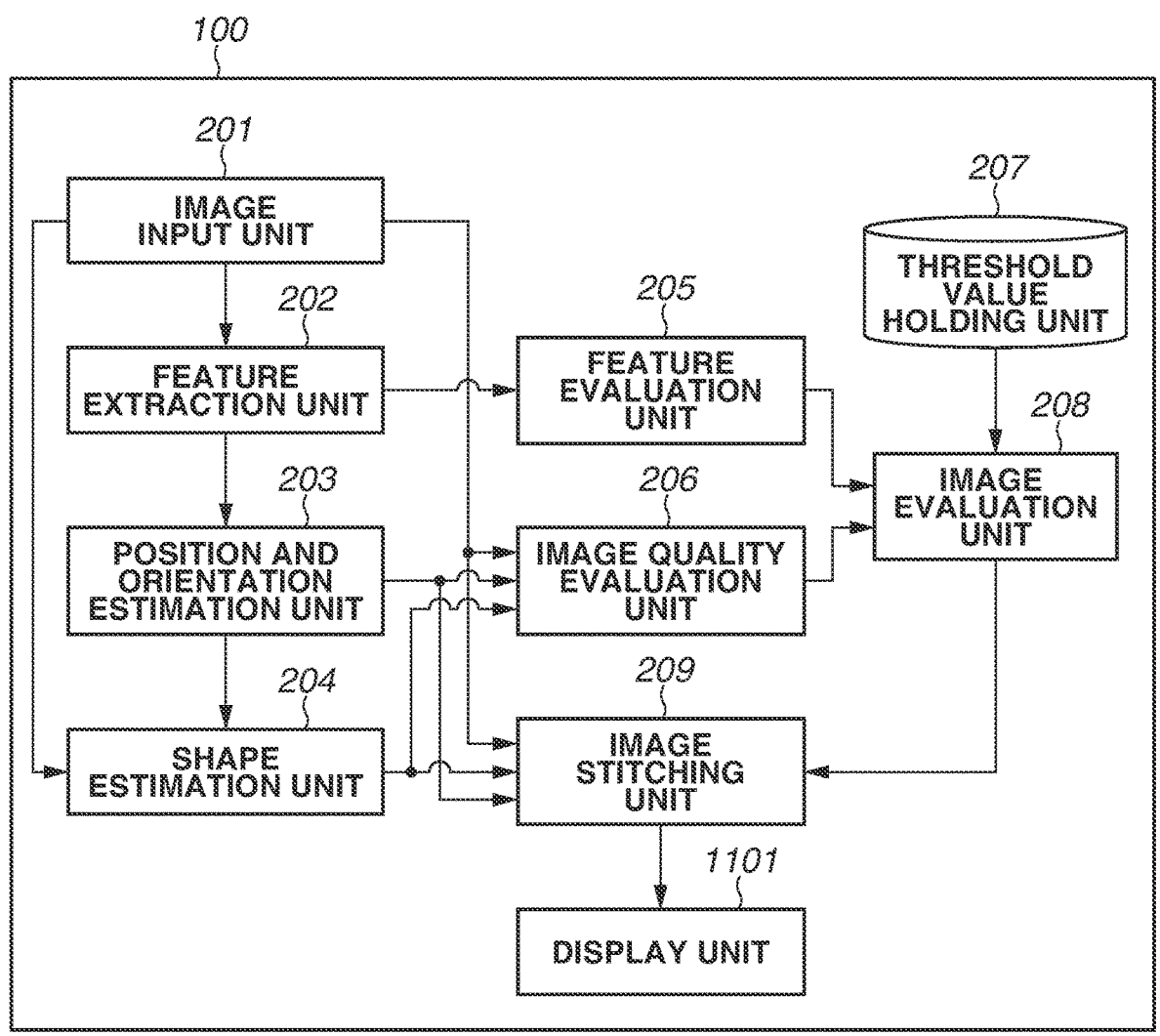
FIG. 11 illustrates a functional configuration of an information processing apparatus according to a third exemplary embodiment.

FIG. 11 is a function block diagram illustrating a functional configuration of the information processing apparatus 100 according to the third exemplary embodiment. The configuration illustrated in FIG. 11 includes the configuration according to the first exemplary embodiment illustrated in FIG. 2 and an additional display unit 1101. The display unit 1101 will be mainly described below.

According to the third exemplary embodiment, the information processing apparatus 100 is connected, for example, to a camera. The image input unit 201 sequentially acquires images of an object captured by the camera. Then, the display unit 1101 instructs the display apparatus 107 to display a stitched image generated by the image stitching unit 209. More specifically, the display unit 1101 instructs the display apparatus 107 to display the stitched image generated by the image stitching unit 209 to present the stitched image to the user who is imaging the target object. The information processing apparatus 100 according to the third exemplary embodiment may be built in the camera.

Figure 12:
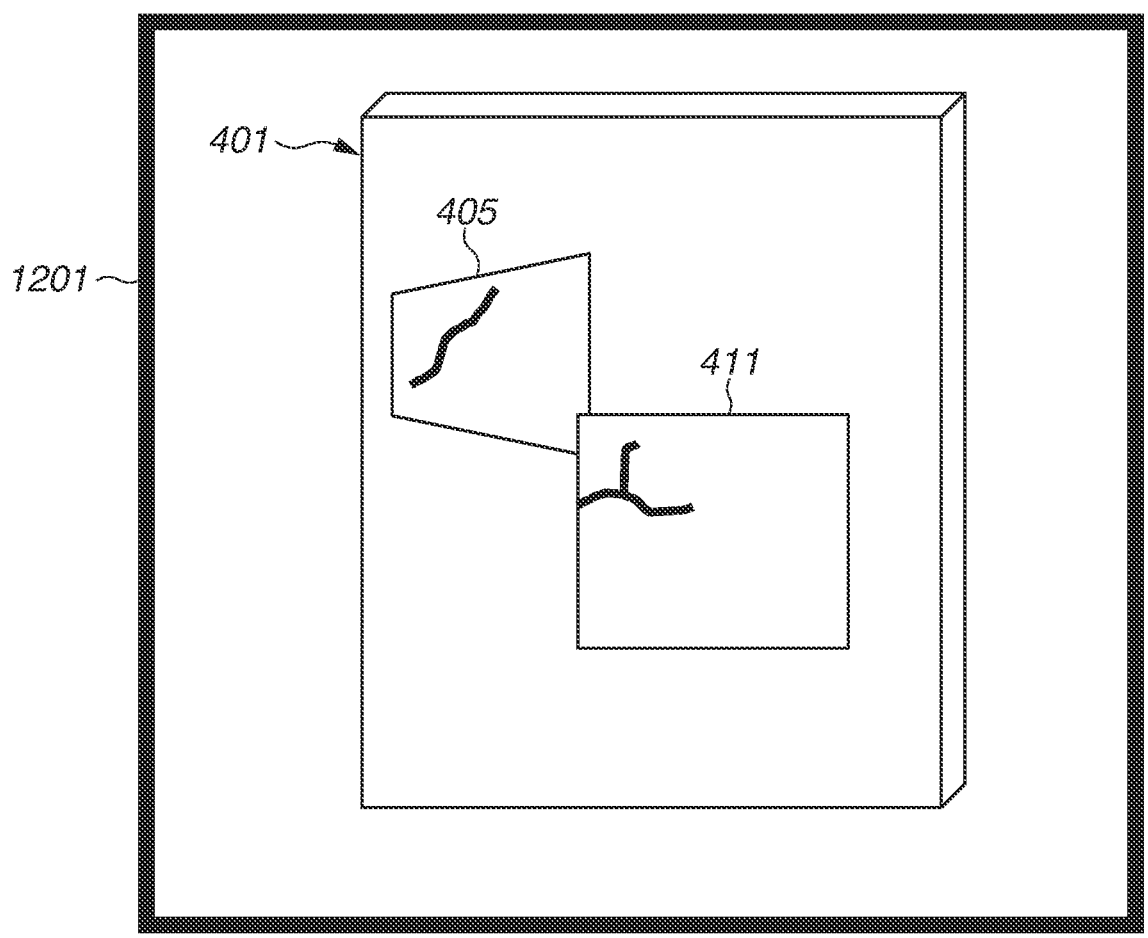
FIG. 12 illustrates display contents on a display unit according to the third exemplary embodiment.

FIG. 12 illustrates display contents on the display unit 1101 according to the third exemplary embodiment. The display unit 1101 displays the three-dimensional shape 401 estimated by the shape estimation unit 204, and the projection images 405 and 411 generated by the image stitching unit 209, on a display screen 1201 of the display apparatus 107. More specifically, the display unit 1101 continues the display corresponding to the sequentially input images to the image input unit 201 while sequentially updating the display.

According to the third exemplary embodiment, the image evaluation unit 208 evaluates new images sequentially acquired by the image input unit 201 but does not re-evaluate images that have already been evaluated. Therefore, according to the third exemplary embodiment, when the image evaluation is completed for all of the images in the processing for evaluating the images available for inspection in step S601 illustrated in FIG. 6 according to the first exemplary embodiment (YES in step S601), the image evaluation unit 208 ends the processing. On the other hand, when the image evaluation is not completed for all of the images (NO in step S601), the processing proceeds to step S602.

If the shape estimation unit 204 does not acquired at least two images from the image input unit 201, the shape estimation unit 204 cannot estimate the three-dimensional shape. Therefore, the display unit 1101 starts displaying the estimated three-dimensional shape 401 after a predetermined number of images are input from the image input unit 201 and the shape estimation is performed by the shape estimation unit 204. According to the present exemplary embodiment, the display unit 1101 starts the display after 10 images have been input from the image input unit 201.

In the processing of the information processing apparatus 100 according to the third exemplary embodiment, processing other than the post-processing in step S507 according to the first exemplary embodiment is similar to the processing according to the first exemplary embodiment. Therefore, the post-processing in step S507 according to the present exemplary embodiment will be described below with reference to the flowchart illustrated in FIG. 13. Processing in steps S801, S802, S803, and S804 illustrated in FIG. 13 is similar to the processing assigned the same reference numerals illustrated in FIG. 8, and redundant descriptions thereof will be omitted.

Figure 13:
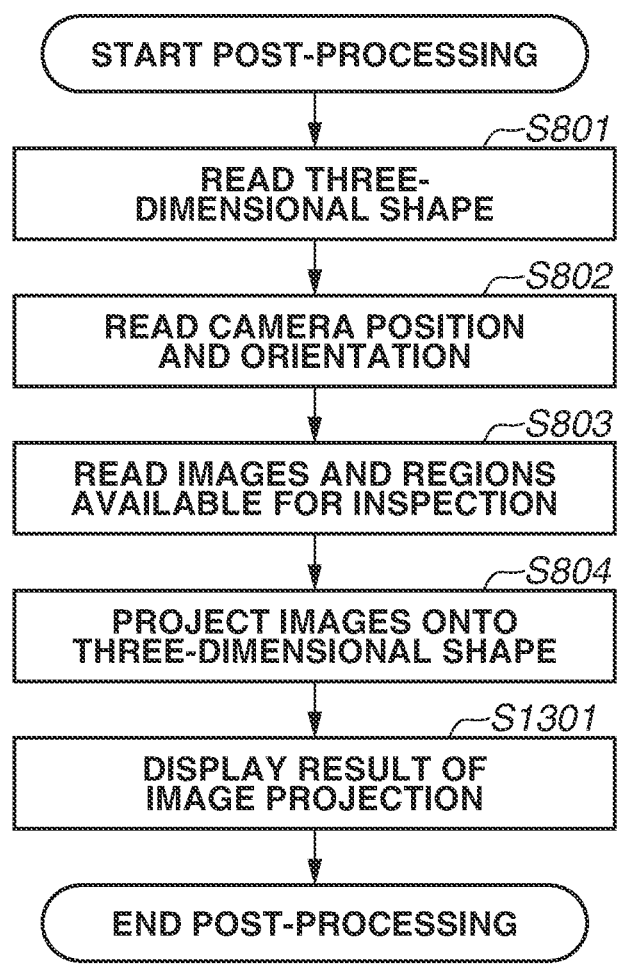
FIG. 13 is a flowchart illustrating post-processing according to the third exemplary embodiment.

Referring to FIG. 13, upon completion of the processing in step S804, the processing of the information processing apparatus 100 proceeds to step S1301.

In step S1301, the display unit 1101 displays the three-dimensional shape 401 and the projection images 405 and 411 on the display screen 1201. Then, the information processing apparatus 100 ends the post-processing in step S507.

As discussed above, the display unit 1101 of the information processing apparatus 100 according to the third exemplary embodiment displays the three-dimensional shape 401 and the projection images 405 and 411 corresponding to the sequentially acquired input images, on the display screen 1201. This enables the user to reference the display on the display screen 1201 during image capturing of the object to recognize regions where inspectable images have been captured and regions where inspectable images have not been captured on the object.

A fourth exemplary embodiment will be described below. In the following descriptions, configurations which have already been described above in the first exemplary embodiment are assigned the same reference numerals, and redundant descriptions thereof will be omitted.

Figure 14:
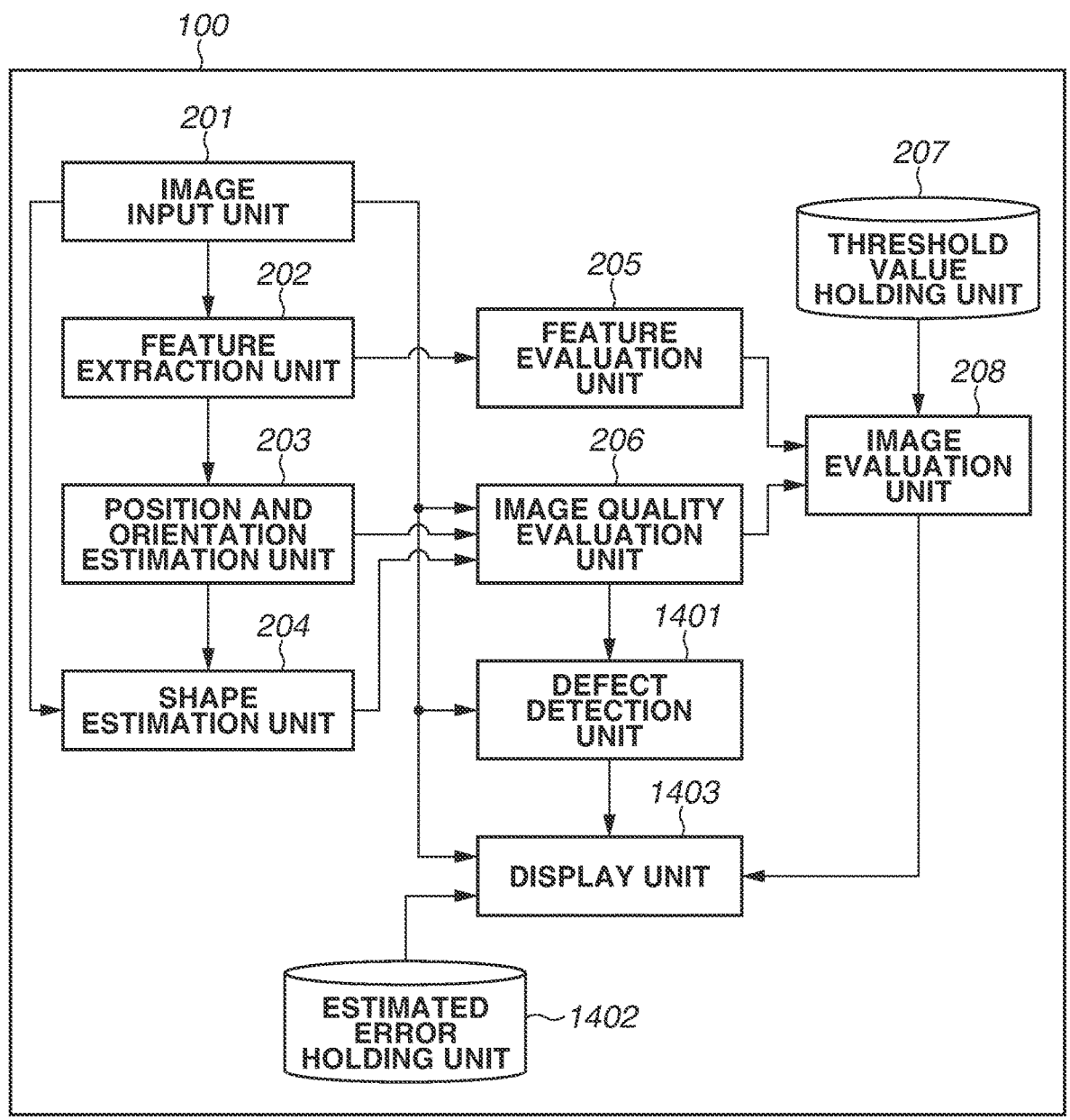
FIG. 14 illustrates a functional configuration of an information processing apparatus according to a fourth exemplary embodiment.

FIG. 14 is a function block diagram illustrating a functional configuration of the information processing apparatus 100 according to the fourth exemplary embodiment. The configuration according to the fourth exemplary embodiment includes the functional configuration according to the first exemplary embodiment illustrated in FIG. 2 and a defect detection unit 1401, an estimation error holding unit 1402, and a display unit 1403 as additional configurations, instead of the image stitching unit 209. Therefore, the defect detection unit 1401, the estimation error holding unit 1402, and the display unit 1403 will be described below.

The defect detection unit 1401 detects cracks as examples of defects based on the images input from the image input unit 201. As a crack detection method, a method for extracting edges by using a Sobel filter is applicable. In addition, the defect detection unit 1401 performs noise removal processing and labeling processing as labeling to the result of crack detection to remove small-area labels. With respect to the labeled cracks, the defect detection unit 1401 further references resolution information on the object input from the image quality evaluation unit 206. Then, the defect detection unit 1401 reads the resolution information on the object corresponding to the labeled crack positions, associates the resolution information with the labeled cracks, and outputs the resolution information to the display unit 1403.

If there are two or more pieces of resolution information on the object corresponding to the labeled cracks, the defect detection unit 1401 supplies information with the lowest resolution. For example, when there are two different resolutions "1 pixel per 1 mm" and "0.5 pixels per 1 mm", the defect detection unit 1401 supplies "0.5 pixels per 1 mm".

Figure 15:
FIG. 15 illustrates a table held in an estimation error holding unit.

The estimation error holding unit 1402 holds a table for the estimation accuracy of the crack width corresponding to the resolution on the object. FIG. 15 illustrates an example of a table 1501 held by the estimation error holding unit 1402. Referring to the table 1501, accuracies 1502, 1503, and 1504 represent the estimation accuracy of the crack width corresponding to the resolution on the object. For example, the accuracy 1502 means that, when image capturing is performed with a resolution of 0.5 pixels per 1 mm on the object, the estimation accuracy of the crack width becomes ±0.2 mm.

The display unit 1403 displays information on the display screen to the user who is imaging the object. The display unit 1403 according to the fourth exemplary embodiment continues the display corresponding to the images sequentially input to the image input unit 201 while updating the display. In the fourth exemplary embodiment, like the third exemplary embodiment, the display unit 1403 starts the display after 10 images have been input from the image input unit 201.

Figure 16:
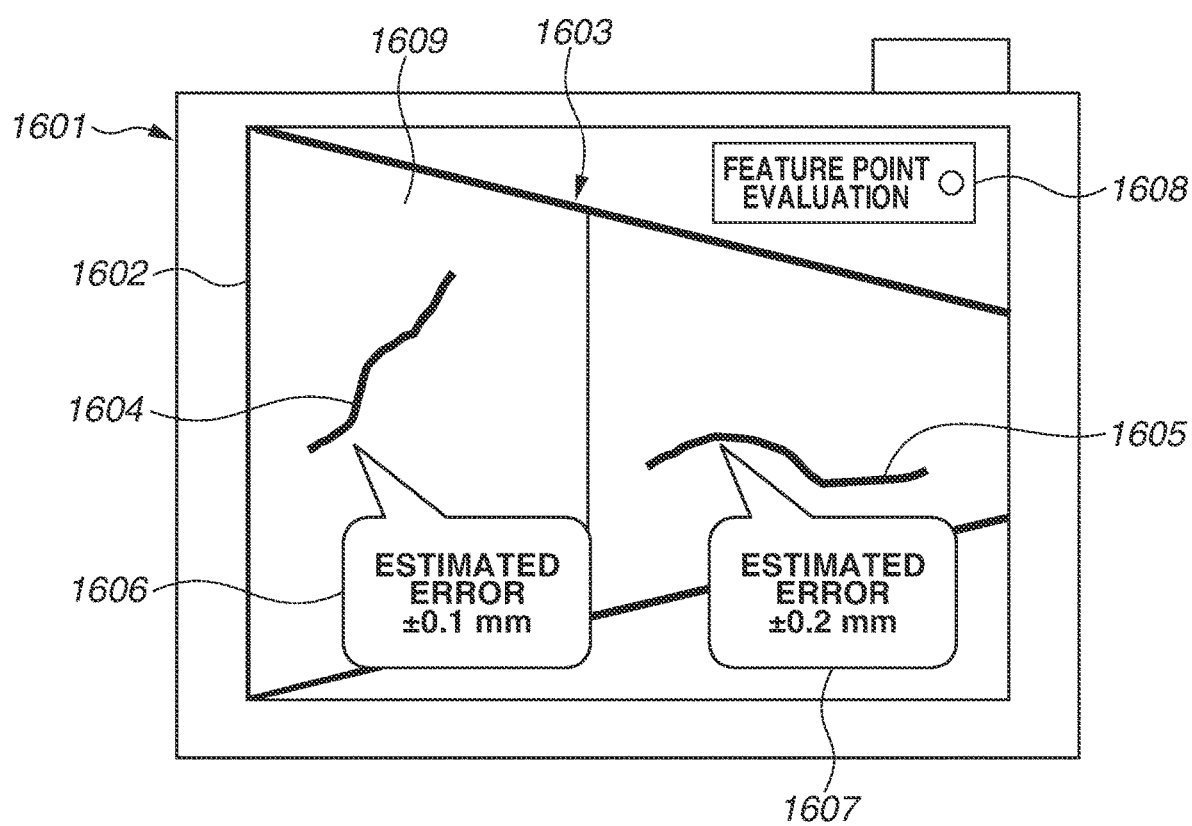
FIG. 16 illustrates display contents on a display unit according to the fourth exemplary embodiment.

FIG. 16 illustrates detailed contents displayed on a display screen 1602 of a camera 1601 by the display unit 1403. More specifically, referring to FIG. 16, the information processing apparatus 100 according to the present exemplary embodiment is built in the camera 1601. The display unit 1403 displays the images input from the image input unit 201, on the display screen 1602 of the camera 1601. In the example illustrated in FIG. 16, the display screen 1602 displays an image capturing target object 1603 on the images input from the image input unit 201. In this example, the camera 1601 performs image capturing from an oblique direction with respect to the surface of the image capturing target object 1603.

The display unit 1403 superimposes information 1609 about the regions available for inspection output from the image evaluation unit 208 onto the images input from the image input unit 201. This display enables the user to grasp which range of the image capturing target object 1603 can be captured as regions available for inspection.

In addition, the display unit 1403 reads information about the evaluation of feature points from the image evaluation unit 208 and displays feature point evaluation information 1608 on the display screen 1602. The feature point evaluation information 1608 displays, for example, "o" and "x" based on the threshold value 302 for the feature point evaluation held by the threshold value holding unit 207. "o" indicates that the feature point evaluation information 1608 is equal to or larger than the threshold value 302, and "x" indicates that the feature point evaluation information 1608 is less than the threshold value 302.

In addition, the display unit 1403 acquires the information about the labeled cracks and the resolution information on the object associated with the labels, input from the defect detection unit 1401. Then, the display unit 1403 references the table of the estimation error holding unit 1402 and acquires crack width estimation error information based on the resolution information on the object.

The display unit 1403 displays crack portions based on the crack information input from the defect detection unit 1401, on the display screen 1602 as crack information 1604 and 1605.

Finally, the display unit 1403 superimposes crack width estimation error information 1606 and 1607 corresponding to the crack information 1604 and 1605, respectively, on the display screen 1602.

Figure 17:
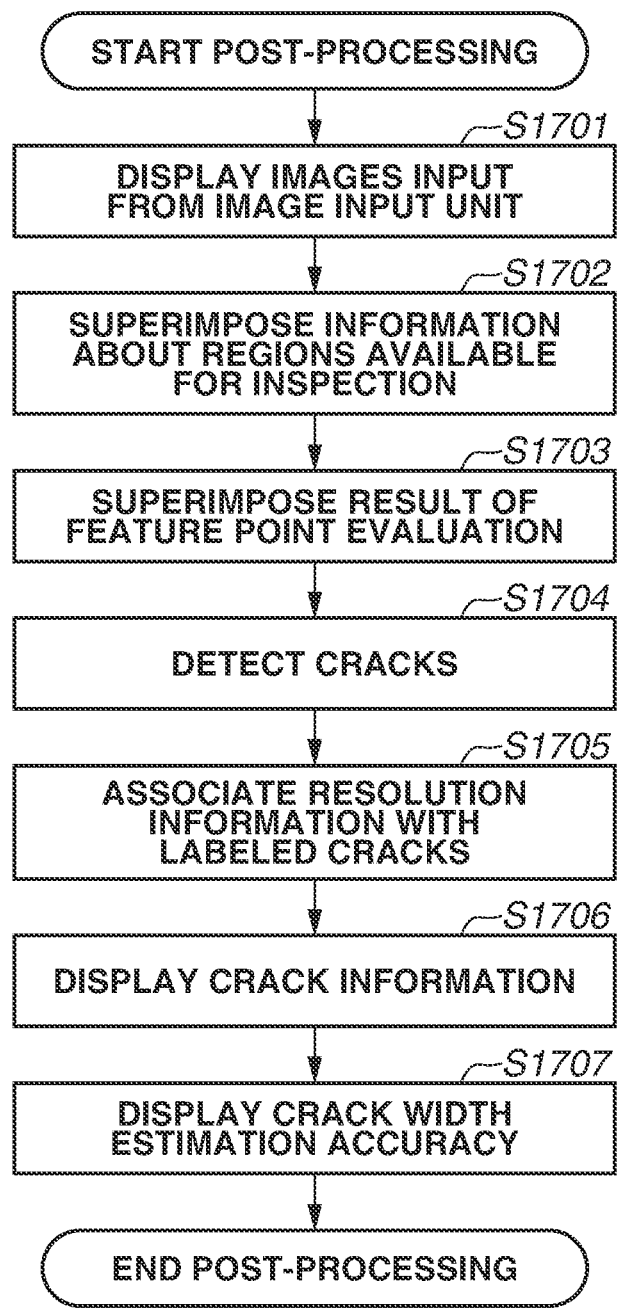
FIG. 17 is a flowchart illustrating post-processing according to the fourth exemplary embodiment.

FIG. 17 is a flowchart illustrating the post-processing flow in the information processing apparatus 100 according to the fourth exemplary embodiment. In the processing flow of the information processing apparatus 100 according to the fourth exemplary embodiment, processing other than the post-processing in step S507 according to the first exemplary embodiment is similar to the processing according to the first exemplary embodiment. The post-processing in step S507 according to the fourth exemplary embodiment will be described below.

In step S1701, the display unit 1403 displays the images input from the image input unit 201 on the display screen 1602. Then, the processing of the display unit 1403 proceeds to step S1702.

In step S1702, the display unit 1403 superimposes the information 1609 about the regions available for inspection output from the image evaluation unit 208, onto the images input from the image input unit 201. Then, the processing of the display unit 1403 proceeds to step S1703.

In step S1703, the display unit 1403 reads the feature point evaluation information from image evaluation unit 208 and displays the feature point evaluation information 1608 on the display screen 1602. Upon completion of step S1703, the processing of the information processing apparatus 100 proceeds to step S1704.

In step S1704, the defect detection unit 1401 detects cracks based on the images input from the image input unit 201. Then, the processing of the defect detection unit 1401 proceeds to step S1705.

In step S1705, the defect detection unit 1401 references the resolution information on the object input from the image quality evaluation unit 206. Then, the defect detection unit 1401 reads the resolution information on the object corresponding to the labeled crack positions, associates the resolution information with the labeled cracks, and outputs the resolution information to the display unit 1403. Upon completion of step S1705, the processing of the information processing apparatus 100 proceeds to step S1706.

In step S1706, the display unit 1403 displays crack portions based on the crack information input from the defect detection unit 1401, on the display screen 1602. Then, the processing of the display unit 1403 proceeds to step S1707.

In step S1707, the display unit 1403 superimposes the crack width estimation error information on the display screen 1602. Then, the information processing apparatus 100 ends the post-processing in step S507.

As discussed above, the information processing apparatus 100 according to the fourth exemplary embodiment displays the information about the regions available for inspection, the feature point evaluation information, the crack information, and the crack width estimation error information on the display screen 1602 of the display unit 1403. The information displayed in this way enables the user to reference the display screen 1602 at the time of image capturing of the object to recognize which region of the object can be captured with an image quality available for inspection at the current capturing angle. The information also enables the user to reference the feature point evaluation information to recognize whether the captured image can be accurately projected at the time of image projection. In addition, the information enables the user to reference the crack information and the crack width estimation error information to confirm whether cracks can be detected and at the same time confirm a measure of the crack width estimation accuracy.

Although, in the fourth exemplary embodiment, the defect detection processing is performed instead of the above-described image stitching processing according to the first to third exemplary embodiments, the present invention is not limited thereto. The above-described defect detection unit 1401 may be used for the defect detection processing for stitched images or the defect detection processing for inspection images according to the second modification of the first exemplary embodiment.

According to the present invention, it becomes possible to acquire images available for the evaluation of defects of an object such as an infrastructure and recognize defects of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-017910, filed Feb. 4, 2019, which is hereby incorporated by reference herein in its entirety.

What is claimed is:

1. An information processing apparatus comprising:
one or more processors; and
one or more memories in communication with the one or more processors,
wherein the one or more processors and the one or more memories cooperate to implement:
a feature extraction unit configured to extract feature points from each of a plurality of images of an object to be inspected captured from a plurality of viewpoints;
a feature evaluation unit configured to perform feature point evaluation including evaluating a positional distribution of the feature points, and evaluating the number of feature points, extracted from each of the plurality of images;
an image quality evaluation unit configured to, for each of the plurality of images, evaluate whether an image quality based on a predetermined index satisfies allowable conditions for inspection works of the object, wherein, for images, among the plurality of images, where a value indicating a result of the feature point evaluation by the feature evaluation unit is equal to or larger than a predetermined threshold value, the image quality evaluation unit evaluates whether the image quality based on the predetermined index satisfies the allowable conditions for inspection works of the object; and
an image stitching unit configured to stitch at least a part of the images, among the plurality of images, having the image quality that satisfies the allowable conditions according to a positional relation based on the feature points extracted by the feature extraction unit.

2. The information processing apparatus according to claim 1,
wherein, each of the plurality of images includes a plurality of regions, and for each of the plurality of regions in each of the plurality of images, the image quality evaluation unit evaluates whether the image quality based on the predetermined index satisfies the allowable conditions for inspection works of the object, and
wherein the image stitching unit stitches partial regions included in the plurality of images having the image quality that satisfies the allowable conditions according to the positional relation based on the extracted feature points.

3. The information processing apparatus according to claim 2, wherein the image quality evaluation unit evaluates a defocus amount for each region in the image.

4. The information processing apparatus according to claim 2, wherein the image quality evaluation unit evaluates a defocus amount for each pixel in the image.

5. The information processing apparatus according to claim 1, wherein the one or more processors and the one or more memories further cooperate to implement:
- a position and orientation estimation unit configured to estimate a position and an orientation of a camera for capturing the plurality of images; and
- a shape estimation unit configured to estimate a three-dimensional shape of the object,
- wherein the position and orientation estimation unit estimates the position and the orientation of the camera based on the feature points extracted by the feature extraction unit, and
- wherein the shape estimation unit estimates the three-dimensional shape based on the position and the orientation of the camera estimated by the position and orientation estimation unit and the plurality of images.

6. The information processing apparatus according to claim 5, wherein, based on the position and the orientation of the camera estimated by the position and orientation estimation unit, the image stitching unit projects the plurality of images based on the evaluation by the image quality evaluation unit onto the three-dimensional shape estimated by the shape estimation unit to stitch the projected image.

7. The information processing apparatus according to claim 6, wherein the one or more processors and the one or more memories further cooperate to implement a display unit,
- wherein the display unit displays the image stitched by the image stitching unit.

8. The information processing apparatus according to claim 1, wherein the one or more processors and the one or more memories further cooperate to implement:
- a detection unit configured to detect defects of the object appearing in the image; and
- a display unit,
- wherein the detection unit detects defects of the object from the plurality of images, and
- wherein the display unit displays information about the detected defects.

9. The information processing apparatus according to claim 8, wherein, based on a result of detecting cracks as the defects by the detection unit and a resolution on the object calculated in the evaluation by the image quality evaluation unit, the display unit estimates and displays an estimation error in the width of the cracks.

10. The information processing apparatus according to claim 1, wherein the one or more processors and the one or more memories further cooperate to implement:
- a generation unit configured to, based on the stitched image, generate an inspection image in which the object is viewed from the front.

11. The information processing apparatus according to claim 10, wherein the one or more processors and the one or more memories further cooperate to implement:
- a detection unit configured to detect defects of the object appearing in the inspection image, wherein the detection unit detects defects of the object based on the inspection image.

12. The information processing apparatus according to claim 1, wherein the object is an infrastructure having a concrete wall surface, and the inspection works are works for identifying defects occurring on the concrete wall surface.

13. An information processing method performed by an information processing apparatus, the method comprising:
- extracting feature points from each of a plurality of images of an object to be inspected captured from a plurality of viewpoints;
- performing feature point evaluation including evaluating a positional distribution of the feature points, and evaluating the number of feature points, extracted from each of the plurality of images;
- evaluating for each of the plurality of images whether an image quality based on a predetermined index satisfies allowable conditions for inspection works of the object, wherein, for images, among the plurality of images, where a value indicating a result of the feature point evaluation by the feature evaluation is equal to or larger than a predetermined threshold value, the evaluating evaluates whether the image quality based on the predetermined index satisfies the allowable conditions for inspection works of the object; and
- stitching at least a part of the images, among the plurality of images, having the image quality that satisfies the allowable conditions according to a positional relation based on the feature points extracted in the extracting.

14. A non-transitory computer-readable medium storing a program for causing a computer to function as:
- a feature extraction unit configured to extract feature points from each of a plurality of images of an object to be inspected captured from a plurality of viewpoints;
- a feature evaluation unit configured to perform feature point evaluation including evaluating a positional distribution of the feature points, and evaluating the number of feature points, extracted from each of the plurality of images;
- an image quality evaluation unit configured to, for each of the plurality of images, evaluate whether an image quality based on a predetermined index satisfies allowable conditions for inspection works of the object, wherein, for images, among the plurality of images, where a value indicating a result of the feature point evaluation by the feature evaluation unit is equal to or larger than a predetermined threshold value, the image quality evaluation unit evaluates whether the image quality based on the predetermined index satisfies the allowable conditions for inspection works of the object; and
- an image stitching unit configured to stitch at least a part of the images, among the plurality of images, having the image quality that satisfies the allowable conditions according to a positional relation based on the feature points extracted by the feature extraction unit.

* * * * *